United States Patent
Ukibune et al.

(10) Patent No.: US 12,235,002 B2
(45) Date of Patent: Feb. 25, 2025

(54) AIR-CONDITIONING SYSTEM INCLUDING A MANAGEMENT SECTION

(71) Applicant: DAIKIN INDUSTRIES, LTD., Osaka (JP)

(72) Inventors: Masanori Ukibune, Osaka (JP); Kouichi Yasuo, Osaka (JP); Masao Ohno, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 1008 days.

(21) Appl. No.: 17/212,954

(22) Filed: Mar. 25, 2021

(65) Prior Publication Data

US 2021/0207834 A1    Jul. 8, 2021

Related U.S. Application Data

(63) Continuation of application No. PCT/JP2019/037592, filed on Sep. 25, 2019.

(30) Foreign Application Priority Data

Sep. 28, 2018  (JP) .................. 2018-184730

(51) Int. Cl.
*F24F 11/46* (2018.01)
*F24F 11/86* (2018.01)
(Continued)

(52) U.S. Cl.
CPC .............. *F24F 11/46* (2018.01); *F24F 11/86* (2018.01); *G05B 19/042* (2013.01); *G05B 2219/2614* (2013.01); *H02J 3/32* (2013.01)

(58) Field of Classification Search
CPC .......... F24F 11/46; F24F 11/86; F24F 5/0017; F24F 2140/60; F24F 11/47; F24F 11/875;
(Continued)

(56) References Cited

U.S. PATENT DOCUMENTS

2014/0230477 A1* 8/2014 Furui ................. F24D 5/02
                                                62/434
2016/0131378 A1* 5/2016 Hinokuma ........... F24F 11/64
                                                62/157

(Continued)

FOREIGN PATENT DOCUMENTS

EP    3 220 071 A1    9/2017
JP    2005-282993 A   10/2005
(Continued)

OTHER PUBLICATIONS

International Search Report of corresponding PCT Application No. PCT/JP2019/037592 dated Dec. 10, 2019.
(Continued)

*Primary Examiner* — Alicia M. Choi
*Assistant Examiner* — Marzia T Monty
(74) *Attorney, Agent, or Firm* — Global IP Counselors, LLP

(57) ABSTRACT

An air-conditioning system includes a refrigerant circuit configured to perform a refrigeration cycle. The refrigerant circuit connects a compressor, a utilization-side heat exchanger that performs air conditioning of an indoor space, and a thermal storage heat exchanger. The air-conditioning system executes a first operation in accordance with a reduction command to reduce commercial power consumption in a whole of the air-conditioning system. The first operation allows the utilization-side heat exchanger to perform air conditioning using the thermal storage heat exchanger as a heat source. The air-conditioning system includes a power reduction section configured to perform a first control in synchronization with timing of a start of the first operation. The first control makes the commercial power consumption in the whole of the air-conditioning system equal to or lower than a first value.

11 Claims, 21 Drawing Sheets

(51) Int. Cl.
*G05B 19/042* (2006.01)
*H02J 3/32* (2006.01)

(58) Field of Classification Search
CPC . G05B 19/042; G05B 2219/2614; H02J 3/32; F25B 2313/0233; F25B 2313/0253; F25B 2313/02732; F25B 2400/13; F25B 2400/24; F25B 2700/15; F25B 13/00; F25B 49/02; Y02E 60/14
See application file for complete search history.

(56) References Cited

U.S. PATENT DOCUMENTS

2017/0261242 A1* 9/2017 Yasuo .................. F24F 11/30
2019/0351742 A1* 11/2019 Fujii .................... B60N 2/5635

FOREIGN PATENT DOCUMENTS

| JP | 2008-25879 A | 2/2008 |
| JP | 2014-129973 A | 7/2014 |
| JP | 2014-152984 A | 8/2014 |
| JP | 2016-125805 A | 7/2016 |

OTHER PUBLICATIONS

International Preliminary Report of corresponding PCT Application No. PCT/JP2019/037592 dated Apr. 8, 2021.
European Search Report of corresponding EP Application No. 19 86,6743.8 dated Jan. 28, 2022.

* cited by examiner

FIG.3 COOLING PEAK SHIFT OPERATION

FIG.4  COOLING PEAK CUT OPERATION

FIG.5 COOLING/COLD THERMAL STORAGE OPERATION

FIG.6 COLD THERMAL STORAGE OPERATION

FIG.7 HEATING OPERATION

FIG.8  HEATING PEAK CUT OPERATION

FIG.9 HEATING/WARM THERMAL STORAGE OPERATION

FIG.10  WARM THERMAL STORAGE OPERATION

AIR-CONDITIONING SYSTEM INCLUDING A MANAGEMENT SECTION

CROSS-REFERENCE TO RELATED APPLICATIONS

This is a continuation of International Application No. PCT/JP2019/037592 filed on Sep. 25, 2019, which claims priority to Japanese Patent Application No. 2018-184730, filed on Sep. 28, 2018. The entire disclosures of these applications are incorporated by reference herein.

BACKGROUND

Field of Invention

The present disclosure relates to an air-conditioning system.

Background Information

An air-conditioning device of Japanese Unexamined Patent Publication No. 2005-282993 includes a refrigerant circuit to which a compressor, an outdoor heat exchanger, an indoor heat exchanger, a heat transfer tube (thermal storage heat exchanger), and the like are connected. The heat transfer tube is provided in a thermal storage tank. In a cooling thermal storage operation, the indoor heat exchanger and the heat transfer tube serve as evaporators, and thus ice is generated inside the thermal storage tank. In a peak cut operation, the indoor heat exchanger serves as an evaporator, and the heat transfer tube serves as a condenser (radiator). That is, a refrigerant dissipates heat to the ice in the heat transfer tube, and then is used in cooling by the indoor heat exchanger.

SUMMARY

A first aspect is directed to an air-conditioning system that includes a refrigerant circuit configured to perform a refrigeration cycle. The refrigerant circuit connects a compressor, a utilization-side heat exchanger that performs air conditioning of an indoor space, and a thermal storage heat exchanger. The air-conditioning system executes a first operation in accordance with a reduction command to reduce commercial power consumption in a whole of the air-conditioning system. The first operation allows the utilization-side heat exchanger to perform air conditioning using the thermal storage heat exchanger as a heat source. The air-conditioning system includes a power reduction section configured to perform a first control in synchronization with timing of a start of the first operation. The first control makes the commercial power consumption in the whole of the air-conditioning system equal to or lower than a first value.

DETAILED DESCRIPTION OF EMBODIMENT(S)

Figure 1:
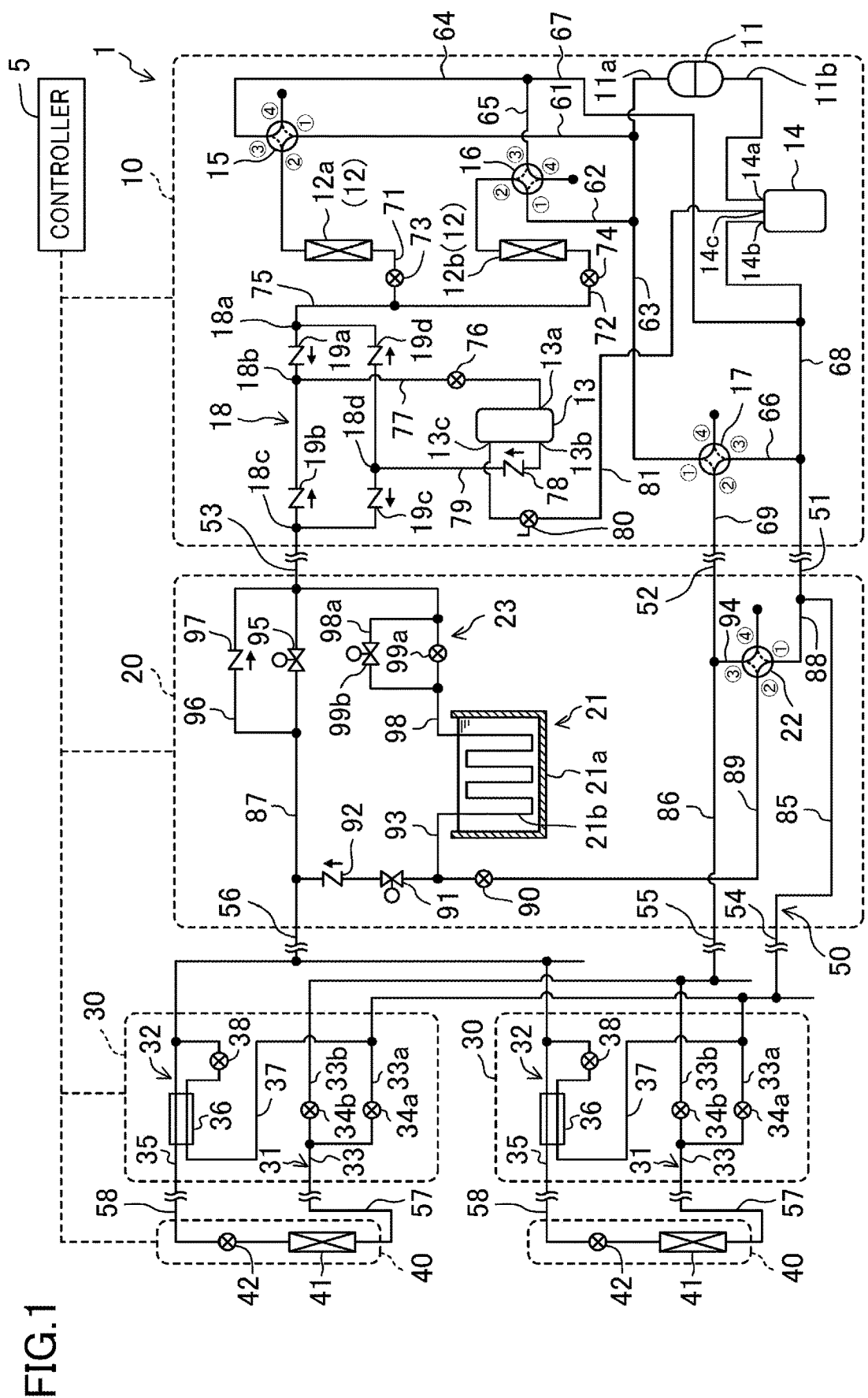
FIG. 1 is a piping system diagram illustrating an air-conditioning system of a first embodiment.

Hereinafter, embodiments of the present disclosure will be described with reference to the drawings. The embodiments described below are merely exemplary ones in nature, and are not intended to limit the scope, applications, or use of the invention.

First Embodiment

A first embodiment is directed to a thermal storage air-conditioning system that stores thermal energy (cold thermal energy and warm thermal energy) in a thermal storage medium and uses the stored thermal energy for air conditioning. The air-conditioning system (1) of the first embodiment includes an outdoor unit (10) (heat-source-side unit), a thermal storage unit (20), a plurality of flow path switching units (30), a plurality of indoor units (40) (utilization-side units), and a refrigerant circuit (50) to which these elements are connected via refrigerant pipes. The plurality of indoor units (40) and the plurality of flow path switching units (30) are connected in parallel to the outdoor unit (10) and the thermal storage unit (20). Each flow path switching unit (30) is connected between the thermal storage unit (20) and each indoor unit (40). The air-conditioning system (1) is configured to be capable of performing a cooling operation and a heating operation, and includes a controller (5) that controls the operations. Note that FIG. 1 and other figures illustrate two of the indoor units (40), and indoor units connected to them in parallel are not shown.

The outdoor unit (10) and the thermal storage unit (20) are connected to each other via an outdoor-side first gas communication pipe (51), an outdoor-side second gas communication pipe (52), and an outdoor-side liquid communication pipe (53). The thermal storage unit (20) and the flow path switching unit (30) are connected to each other via an intermediate portion first gas communication pipe (54), an intermediate portion second gas communication pipe (55), and an intermediate portion liquid communication pipe (56). The flow path switching unit (30) and the indoor unit (40) are connected to each other via an indoor-side gas communication pipe (57) and an indoor-side liquid communication pipe (58).

Outdoor Unit

The outdoor unit (10) is provided with a compressor (11), an outdoor heat exchanger (12), a receiver (13), an accumulator (14), a first four-way switching valve (15), a second four-way switching valve (16), a third four-way switching valve (17), and a bridge circuit (18). A discharge pipe (11a) of the compressor (11) branches into a discharge-side first branch pipe (61), a discharge-side second branch pipe (62), and a discharge-side third branch pipe (63). The discharge-side first branch pipe (61) is connected to a first port of the first four-way switching valve (15), and the discharge-side second branch pipe (62) is connected to a first port of the second four-way switching valve (16). The discharge-side third branch pipe (63) is connected to a first port of the third four-way switching valve (17).

The outdoor heat exchanger (12) includes a first outdoor heat exchanger (12a) and a second outdoor heat exchanger (12b). A gas-side end of the first outdoor heat exchanger (12a) is connected to a second port of the first four-way switching valve (15), and a gas-side end of the second outdoor heat exchanger (12b) is connected to a second port of the second four-way switching valve (16). A suction-side first branch pipe (64) is connected to a third port of the first four-way switching valve (15), a suction-side second branch pipe (65) is connected to a third port of the second four-way switching valve (16), and a suction-side third branch pipe (66) is connected to a third port of the third four-way switching valve (17). The suction-side first branch pipe (64) and the suction-side second branch pipe (65) are connected to one end of an outdoor low-pressure pipe (67). A suction pipe (11b) of the compressor (11) is connected to a gas outflow port (14a) of the accumulator (14). One end of an outdoor-side first gas pipe (68) is connected to a first gas inflow port (14b) of the accumulator (14). Another end of the outdoor low-pressure pipe (67) joins together with the outdoor-side first gas pipe (68). Another end of the outdoor-side first gas pipe (68) is connected to the outdoor-side first gas communication pipe (51).

One end of an outdoor-side second gas pipe (69) is connected to a second port of the third four-way switching valve (17). Another end of the outdoor-side second gas pipe (69) is connected to the outdoor-side second gas communication pipe (52).

A fourth port of the first four-way switching valve (15), a fourth port of the second four-way switching valve (16), and a fourth port of the third four-way switching valve (17) are closed closure ports. Each of the first four-way switching valve (15), the second four-way switching valve (16), and the third four-way switching valve (17) is configured to be switchable to a first mode (communication mode indicated by solid lines FIG. 1) in which the first port and the second port communicate with each other and the third port and the fourth port communicate with each other, and a second mode (communication mode indicated by dashed lines in FIG. 1) in which the first port and the fourth port communicate with each other and the second port and the third port communicate with each other. In FIG. 1, the first four-way switching valve (15) and the second four-way switching valve (16) are in the first mode, and the third four-way switching valve (17) is in the second mode.

A liquid-side end of the first outdoor heat exchanger (12a) is connected to an outdoor-side liquid first branch pipe (71), and a liquid-side end of the second outdoor heat exchanger (12b) is connected to an outdoor-side liquid second branch pipe (72). An outdoor-side first expansion valve (73) (expansion mechanism) is connected to the outdoor-side liquid first branch pipe (71), and an outdoor-side second expansion valve (74) (expansion mechanism) is connected to the outdoor-side liquid second branch pipe (72). The outdoor-side liquid first branch pipe (71) and the outdoor-side liquid second branch pipe (72) join together and are connected to an outdoor-side liquid pipe (75). The outdoor-side liquid pipe (75) is connected to the outdoor-side liquid communication pipe (53) via the bridge circuit (18).

The receiver (13) capable of storing a liquid refrigerant is connected to the outdoor-side liquid pipe (75) via the bridge circuit (18). The bridge circuit (18) is a closed circuit having a first connecting point (18a), a second connecting point (18b), a third connecting point (18c), and a fourth connecting point (18d), which are connected to each other via pipes. A first check valve (19a) is provided between the first connecting point (18a) and the second connecting point (18b). The first check valve (19a) allows the refrigerant to flow in a direction from the first connecting point (18a) toward the second connecting point (18b) and disallows the refrigerant to flow in the reverse direction. A second check valve (19b) is provided between the third connecting point (18c) and the second connecting point (18b). The second check valve (19b) allows the refrigerant to flow in a direction from the third connecting point (18c) toward the second connecting point (18b) and disallows the refrigerant to flow in the reverse direction. A third check valve (19c) is provided between the fourth connecting point (18d) and the third connecting point (18c). The third check valve (19c) allows the refrigerant to flow in a direction from the fourth connecting point (18d) toward the third connecting point (18c) and disallows the refrigerant to flow in the reverse direction. A fourth check valve (19d) is provided between the fourth connecting point (18d) and the first connecting point (18a). The fourth check valve (19d) allows the refrigerant to flow in a direction from the fourth connecting point (18d) toward the first connecting point (18a) and disallows the refrigerant to flow in the reverse direction.

The second connecting point (18b) of the bridge circuit (18) and the liquid inflow port (13a) of the receiver (13) are connected by a liquid inflow pipe (77) having an outdoor flow rate regulating valve (76). A liquid outflow port (13b) of the receiver (13) and the fourth connecting point (18d) of the bridge circuit (18) are connected by a liquid outflow pipe (79). The liquid outflow pipe (79) is provided with an outdoor check valve (78) that allows the refrigerant to flow from the receiver (13) toward the fourth connecting point (18d) and disallows the refrigerant to flow in the reverse direction. A gas outflow port (13c) of the receiver (13) is connected to one end of a venting pipe (81) provided with a venting valve (80) whose opening degree is adjustable. Another end of the venting pipe (81) is connected to a second gas inflow port (14c) of the accumulator (14).

Thermal Storage Unit

The thermal storage unit (20) includes a thermal storage heat exchanger (21), a fourth four-way switching valve (22), and a flow rate regulating mechanism (23). The thermal storage heat exchanger (21) includes a thermal storage tank (21a) storing, for example, water as a thermal storage medium, and a multi-path (not shown) heat transfer tube (21b) provided inside the thermal storage tank (21a). The thermal storage heat exchanger (21) is of a so-called static type. During the cooling operation, when the thermal storage heat exchanger (21) serves as an evaporator, it generates ice around the heat transfer tube (21b) inside the thermal storage tank (21a) using a low-temperature refrigerant, whereas, when the thermal storage heat exchanger (21) serves as a radiator, the refrigerant dissipates heat to the ice. During heating operation, when the thermal storage heat exchanger (21) serves as a radiator, it heats water to generate warm water, whereas, when the thermal storage heat exchanger (21) serves as an evaporator, the refrigerant absorbs heat from the warm water.

The thermal storage unit (20) includes a thermal storage-side first gas pipe (85), a thermal storage-side second gas pipe (86), and a thermal storage-side liquid pipe (87). The thermal storage-side first gas pipe (85) is connected to the outdoor-side first gas communication pipe (51) and the intermediate portion first gas communication pipe (54). The thermal storage-side first gas pipe (85) is connected to the outdoor-side first gas communication pipe (51) and the intermediate portion first gas communication pipe (54). The thermal storage-side second gas pipe (86) is connected to the outdoor-side second gas communication pipe (52) and the intermediate portion second gas communication pipe (55). The thermal storage-side liquid pipe (87) is connected to the outdoor-side liquid communication pipe (53) and the intermediate portion liquid communication pipe (56).

A first port of the fourth four-way switching valve (22) is connected to the thermal storage-side first gas pipe (85) via a first connection pipe (88). One end of a second connection pipe (89) is connected to a second port of the fourth four-way switching valve (22). Another end of the second connection pipe (89) is connected to the thermal storage-side liquid pipe (87). A thermal storage-side first flow rate regulating valve (90) configured as a motor-operated valve, a thermal storage-side first open/close valve (91) (electromagnetic valve), and a thermal storage-side first check valve (92) allowing the refrigerant to flow only in a direction toward the thermal storage-side liquid pipe (87) are arranged in series in the second connection pipe (89). A thermal storage-side first branch pipe (93), connected to the second connection pipe (89) at a position between the thermal storage-side first flow rate regulating valve (90) and the thermal storage-side first open/close valve (91), is connected to a gas-side end of the heat transfer tube (21b) of the thermal storage heat exchanger (21). A third port of the fourth four-way switching valve (22) is connected to the thermal storage-side second gas pipe (86) via a third connection pipe (94). A fourth port of the fourth four-way switching valve (22) is a closed closure port.

The fourth four-way switching valve (22) is configured to be switchable to a first mode (mode indicated by solid lines FIG. 1) in which the first port and the second port communicate with each other and the third port and the fourth port communicate with each other, and a second mode (mode indicated by dashed lines in FIG. 1) in which the first port and the fourth port communicate with each other and the second port and the third port communicate with each other.

The thermal storage-side liquid pipe (87) is provided with a thermal storage-side second open/close valve (95). The thermal storage-side second open/close valve (95) is configured to allow the refrigerant to flow only in a direction from the outdoor-side liquid pipe (75) toward the intermediate portion liquid communication pipe (56). A first bypass passage (96) bypassing the thermal storage-side second open/close valve (95) is connected to the thermal storage-side liquid pipe (87). The first bypass passage (96) is provided with a thermal storage-side second check valve (97) that allows the refrigerant to flow from the intermediate portion liquid communication pipe (56) toward the outdoor-side liquid pipe (75), and disallows the refrigerant to flow in the reverse direction.

A liquid-side end of the thermal storage heat exchanger (21) is connected to the thermal storage-side liquid pipe (87) at a position between the outdoor-side liquid pipe (75) and the thermal storage-side second open/close valve (95) via a thermal storage-side second branch pipe (98). The flow rate regulating mechanism (23) is connected to the thermal storage-side second branch pipe (98). The flow rate regulating mechanism (23) includes a thermal storage-side flow rate regulating valve (99a) (opening degree adjusting valve) provided in the thermal storage-side second branch pipe (98), and a thermal storage-side third open/close valve (99b) (electromagnetic valve) provided in a second bypass passage (98a) bypassing the thermal storage-side flow rate regulating valve (99a) (opening adjusting valve).

Flow Path Switching Unit

The flow path switching unit (30) includes a gas-side connection pipe (31) and a liquid-side connection pipe (32). The gas-side connection pipe (31) includes a gas-side main pipe (33), a switching portion first branch pipe (33a), and a switching portion second branch pipe (33b). The switching portion first branch pipe (33a) is provided with a first flow path switching valve (34a). The switching portion second branch pipe (33b) is provided with a second flow path switching valve (34b). One end of the gas-side main pipe (33) is connected to the indoor-side gas communication pipe (57). Another end of the gas-side main pipe (33) is connected to one end of the switching portion first branch pipe (33a) and one end of the switching portion second branch pipe (33b). Another end of the switching portion first branch pipe (33a) is connected to the intermediate portion first gas communication pipe (54). Another end of the switching portion second branch pipe (33b) is connected to the intermediate portion second gas communication pipe (55).

The first flow path switching valve (34a) and the second flow path switching valve (34b) are control valves allowing or disallowing the refrigerant to flow in each flow path switching unit (30). Each flow path switching valve (34a, 34b) is configured as a motor-operated regulating valve capable of regulating an opening degree by driving a motor.

Thus, flow paths of the indoor refrigerant in the refrigerant circuit (50) may be switched by electric control. The flow of the refrigerant may be controlled by opening or closing the motor-operated regulating valve. The cooling operation and the heating operation may be switched in each indoor unit (40) separately. Note that an electromagnetic open/close valve may be used for each flow path switching valve (34*a*, 34*b*) instead of the motor-operated regulating valve.

The liquid-side connection pipe (32) includes a liquid-side main pipe (35) to which a subcooling heat exchanger (36) is connected. One end of a subcooling pipe (37) is connected to the liquid-side main pipe (35) at a position between the intermediate portion liquid communication pipe (56) and the subcooling heat exchanger (36). The subcooling pipe (37) passes through the inside of the subcooling heat exchanger (36), and another end of the subcooling pipe (37) is connected to the switching portion first branch pipe (33*a*) at a position between the first flow path switching valve (34*a*) and the intermediate portion first gas communication pipe (54). The subcooling pipe (37) is provided with a flow rate regulating valve (38) between the liquid-side main pipe (35) and the subcooling heat exchanger (36). The amount of the refrigerant flowing into the subcooling circuit is regulated by regulating an opening degree of the flow rate regulating valve (38).

Indoor Unit

Each indoor unit (40) includes an indoor heat exchanger (41) (utilization-side heat exchanger) and an indoor expansion valve (42). The indoor expansion valve (42) is configured as an electronic expansion valve capable of regulating its opening degree. In the indoor unit (40), a gas-side end of the indoor heat exchanger (41) is connected to the flow path switching unit (30) via the indoor-side gas communication pipe (57), and the indoor expansion valve (42) is connected to the flow path switching unit (30) via the indoor-side liquid communication pipe (58).

Schematic Configuration of Controller

The controller (5) includes a microcomputer mounted on a control board, and a memory device (specifically, a semiconductor memory) storing software for operating the microcomputer. The controller (5) controls various appliances of the air-conditioning system (1) on the basis of an operation command or a detection signal of a sensor. Controlling the various appliances by the controller (5) makes it possible to switch operations of the air-conditioning system (1).

The figures illustrate a configuration in which one controller (5) is connected to each unit and a refrigerant switching device. However, depending on installation conditions, the controller (5) may include a plurality of controllers (5) and the respective controllers (5) may be configured to perform control together.

Operation

The air-conditioning system (1) of this embodiment switches a cooling operation, a cooling peak shift operation (subcooling operation), a cooling peak cut operation, a cooling/cold thermal storage operation, a cold thermal storage operation, a heating operation, a heating peak cut operation, a heating/warm thermal storage operation, and a warm thermal storage operation to perform the operation. In the air-conditioning system (1), switching settings of a refrigerant flow direction in the flow path switching unit (30) allows the cooling operation and the heating operation in the plurality of indoor units (40) to be performed. However, an explanation of this process will be omitted.

Hereinafter, an operation in the refrigerant circuit (50) in each operation mode will be described.

Cooling Operation

Figure 2:
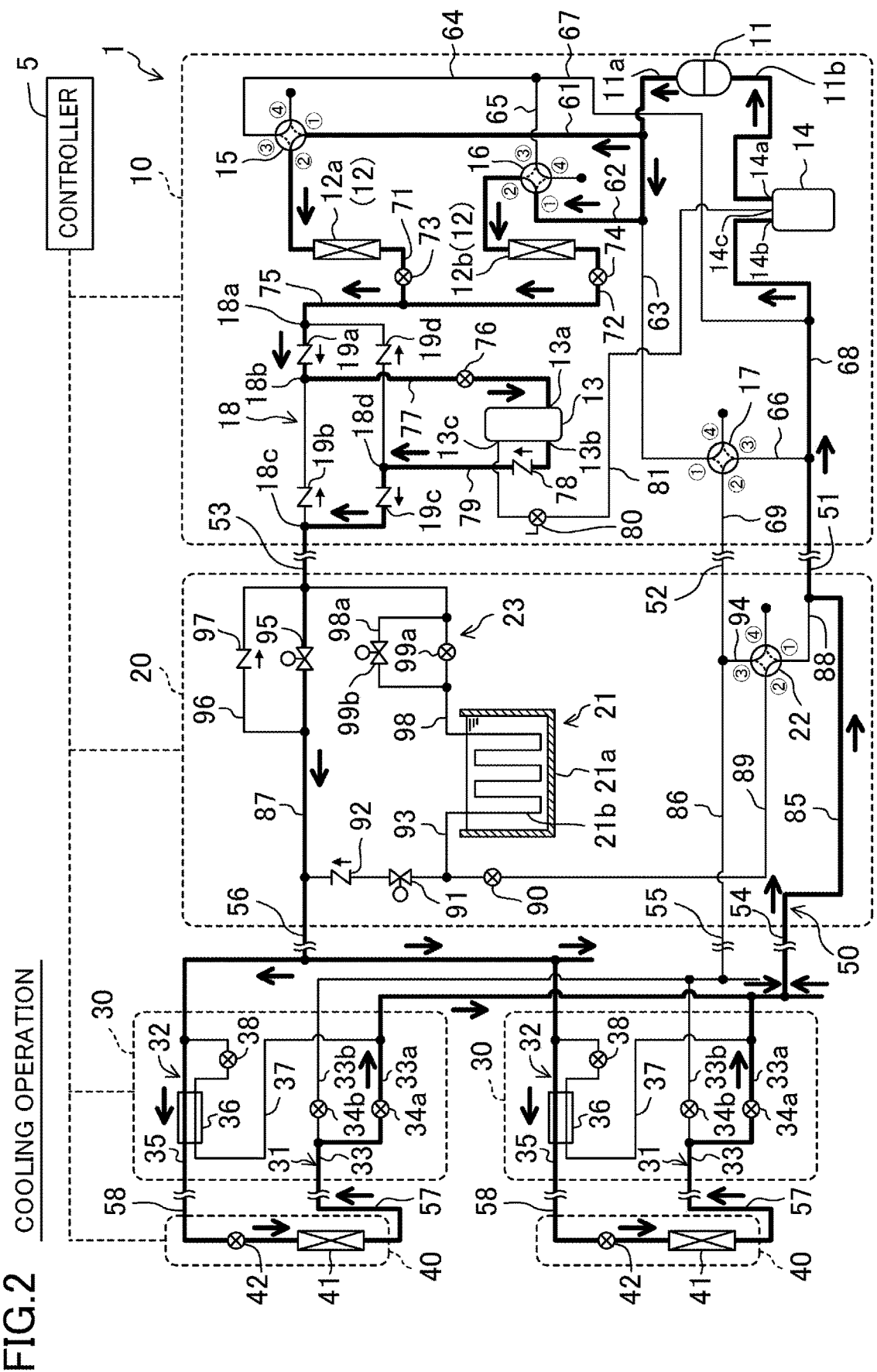
FIG. 2 is a diagram illustrating a flow of a refrigerant during a cooling operation in the piping system diagram of the air-conditioning system of the first embodiment.

The cooling operation shown in FIG. 2 is an operation in which the refrigerant circulates in the refrigerant circuit (50) with the outdoor heat exchanger (12) serving as a radiator and the indoor heat exchanger (41) serving as an evaporator without use of the thermal storage heat exchanger (21).

During the cooling operation, the first four-way switching valve (15) and the second four-way switching valve (16) in the outdoor unit (10) are set to the first mode. In a mode shown in FIG. 2, both the outdoor-side first expansion valve (73) and the outdoor-side second expansion valve (74) are in the fully open position. However, if the operation is performed by only one outdoor heat exchanger (12), either the outdoor-side first expansion valve (73) or the outdoor-side second expansion valve (74) is closed (this applies to each operation described below). The outdoor flow rate regulating valve (76) is set to fully open.

In the thermal storage unit (20), the thermal storage-side second open/close valve (95) is open, and the thermal storage-side flow rate regulating valve (99*a*) and the thermal storage-side third open/close valve (99*b*) are closed.

Assuming that the cooling operation is performed in each indoor unit (40), the first flow path switching valve (34*a*) is open, the second flow path switching valve (34*b*) is closed, and the flow rate regulating valve is controlled to open to a predetermined opening degree, in the flow path switching unit (30). In the indoor unit (40), the indoor expansion valve (42) is controlled to open to a predetermined opening degree.

Note that, although not shown, if there are the indoor unit (40) performing the cooling operation and the indoor unit (40) performing the heating operation, the third four-way switching valve (17) of the outdoor unit (10) is switched to the second mode, the indoor expansion valve (42) of the indoor unit (40) performing the heating operation is fully open, the first flow path switching valve (34*a*) is closed, and the second flow path switching valve (34*b*) is open.

During the cooling operation shown in FIG. 2, the refrigerant discharged from the compressor (11) dissipates heat in the first outdoor heat exchanger (12*a*) and the second outdoor heat exchanger (12*b*), and the condensed or cooled refrigerant flows into the receiver (13). The refrigerant flowing out of the receiver (13) passes through the thermal storage-side liquid pipe (87) of the thermal storage unit (20). Then, the refrigerant is subcooled in the flow path switching unit (30), and flows into the indoor unit (40).

In the indoor unit (40), the refrigerant is decompressed by the indoor expansion valve (42), absorbs heat from indoor air in the indoor heat exchanger (41), and evaporates. At this time, the indoor air is cooled and the indoor space is cooled. The refrigerant that flowed out of the indoor unit (40) passes through the gas-side connection pipe (31) of the flow path switching unit (30) and the thermal storage-side first gas pipe (85) of the thermal storage unit (20), and returns to the outdoor unit (10). The refrigerant flows from the outdoor-side first gas pipe (68) of the outdoor unit (10) into the accumulator (14), and then is sucked into the compressor (11).

Figure 11:
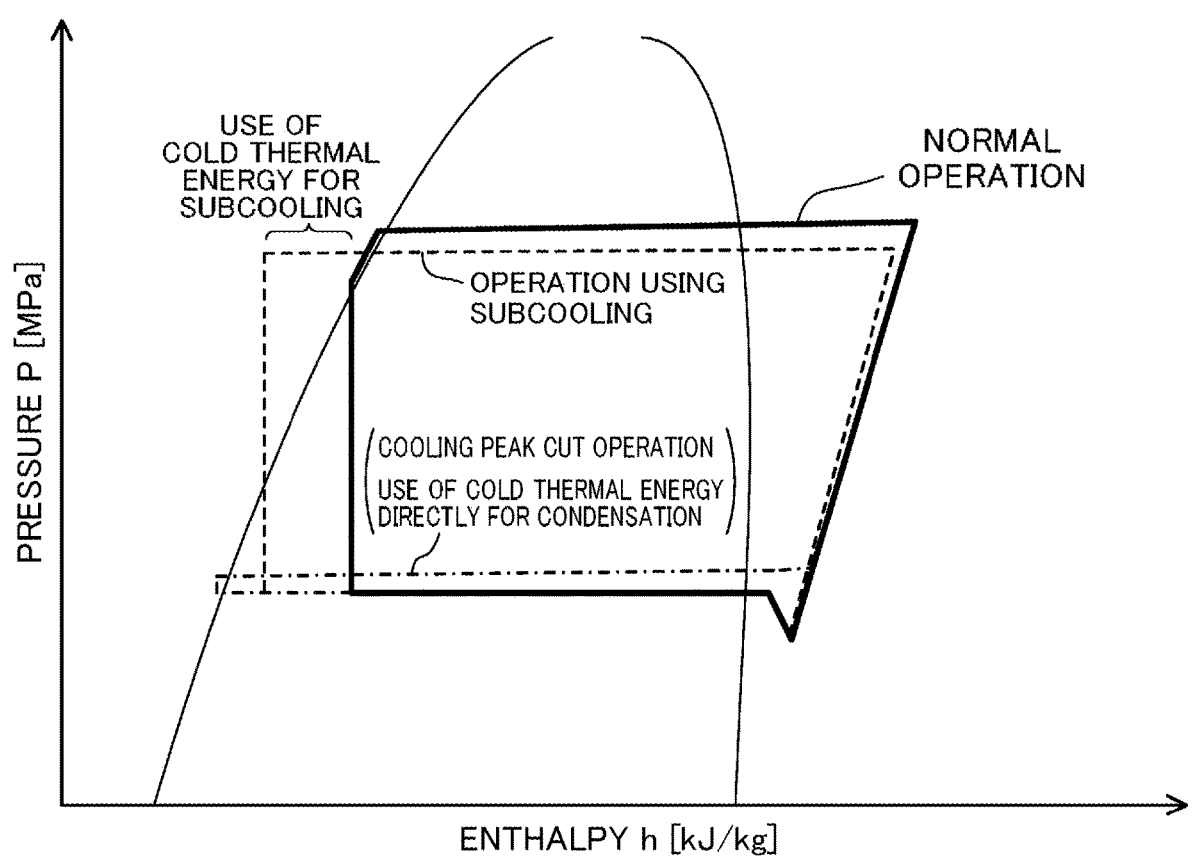
FIG. 11 is a Mollier diagram in which refrigeration cycles in the respective operations are compared.

During the cooling operation, a refrigeration cycle in which the above process is continued is performed in the refrigerant circuit (50). FIG. 11 shows a P-h diagram of the refrigeration cycle indicated as "normal operation". In this mode, a difference between high and low pressure of the refrigerant is larger and an enthalpy difference is smaller than in the cooling peak cut operation and the cooling peak shift operation described below.

Cooling Peak Shift Operation

Figure 3:
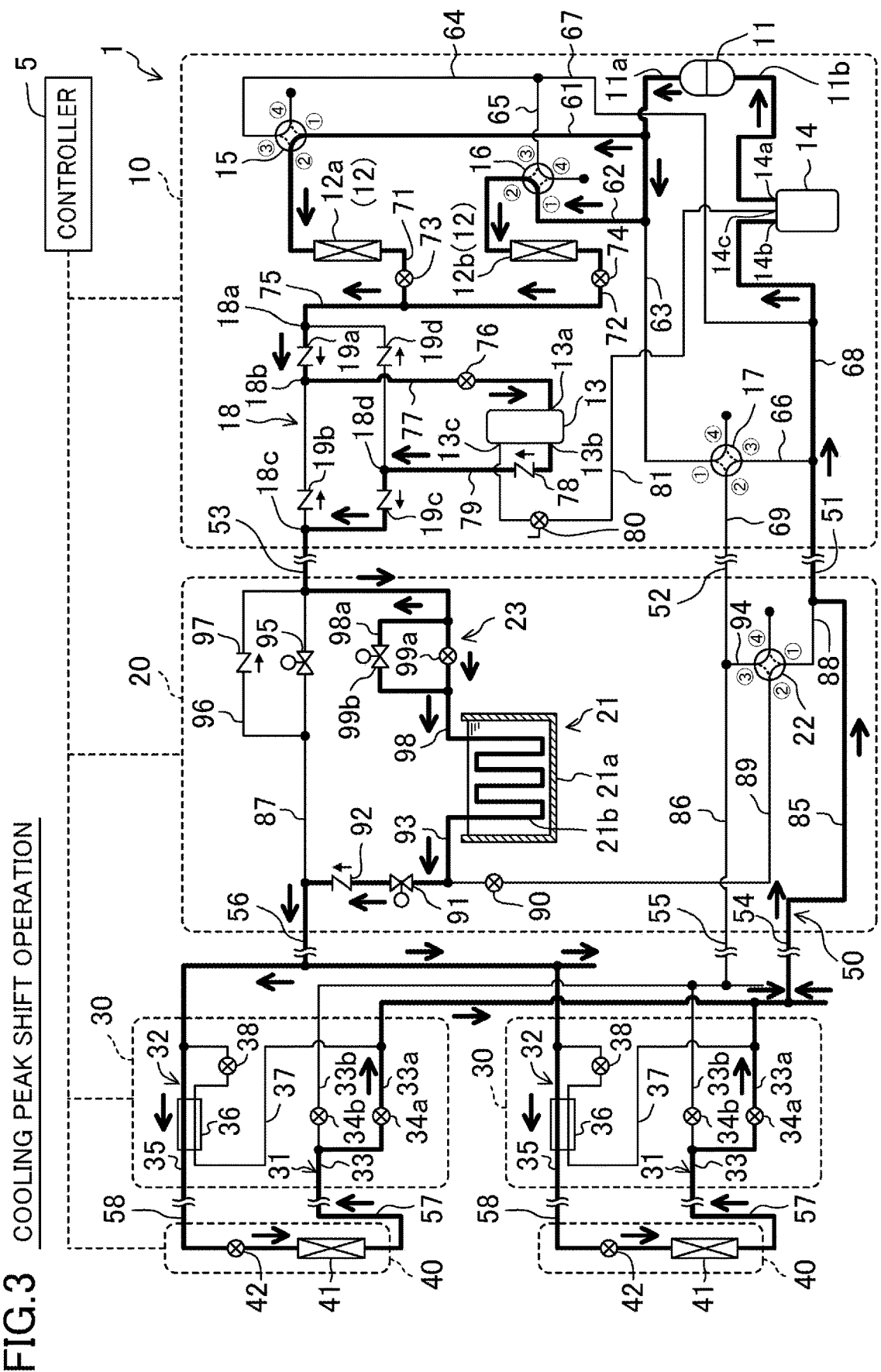
FIG. 3 is a diagram illustrating a flow of the refrigerant during a cooling peak shift operation in the piping system diagram of the air-conditioning system of the first embodiment.

The cooling peak shift operation shown in FIG. 3 is an operation in which the refrigerant circulates in the refrigerant circuit (50) with the thermal storage heat exchanger (21), in which ice is generated inside the thermal storage tank (21*a*), being used as the subcooling heat exchanger (36), the outdoor heat exchanger (12) serving as a radiator, and the indoor heat exchanger (41) serving as an evaporator.

During the cooling peak shift operation, the outdoor unit (10), the flow path switching unit (30), and the various valves of the indoor unit (40) are controlled in the same manner as in the cooling operation. In the thermal storage unit (20), the thermal storage-side second open/close valve (95) is closed, and the thermal storage-side flow rate regulating valve (99*a*) and the thermal storage-side third open/close valve (99*b*) are open. Note that the thermal storage-side third open/close valve (99*b*) may be open and the thermal storage-side flow rate regulating valve (99*a*) may be closed. The thermal storage-side first flow rate regulating valve (90) is closed and the thermal storage-side first open/close valve (91) is open.

During the cooling peak shift operation, the refrigerant discharged from the compressor (11) dissipates heat in the first outdoor heat exchanger (12*a*) and the second outdoor heat exchanger (12*b*), and the condensed and cooled refrigerant flows into the receiver (13). The refrigerant that has flowed out of the receiver (13) branches from the thermal storage-side liquid pipe (87) of the thermal storage unit (20) into the thermal storage-side second branch pipe (98), and flows into the thermal storage heat exchanger (21) to be subcooled.

The subcooled refrigerant passes through each flow path switching unit (30) and flows into each indoor unit (40). The refrigerant is decompressed by the indoor expansion valve (42), and then evaporates in the indoor heat exchanger (41). At that time, the indoor air is cooled and the indoor space is cooled. The refrigerant that has been evaporated in the indoor heat exchanger (41) passes through the gas-side connection pipe (31) of the flow path switching unit (30) and the thermal storage-side first gas pipe (85) of the thermal storage unit (20), and returns to the outdoor unit (10). The refrigerant that has returned to the outdoor unit (10) is sucked into the compressor (11) via the accumulator (14).

During the cooling peak shift operation, a refrigeration cycle in which the above operation is continued is performed in the refrigerant circuit (50). As shown in FIG. 11 illustrating the P-h diagram of the cooling peak shift operation, in this mode, the difference between high and low pressure of the refrigerant is smaller than in the cooling operation, and the enthalpy difference is larger than in the cooling operation since the refrigerant is subcooled in the thermal storage heat exchanger (21). Since the difference between high and low pressure is small, a small input of the compressor (11) is sufficient. Thus, the power consumption is reduced and a coefficient of performance (COP) is high, as compared to the normal cooling operation.

Cooling Peak Cut Operation

Figure 4:
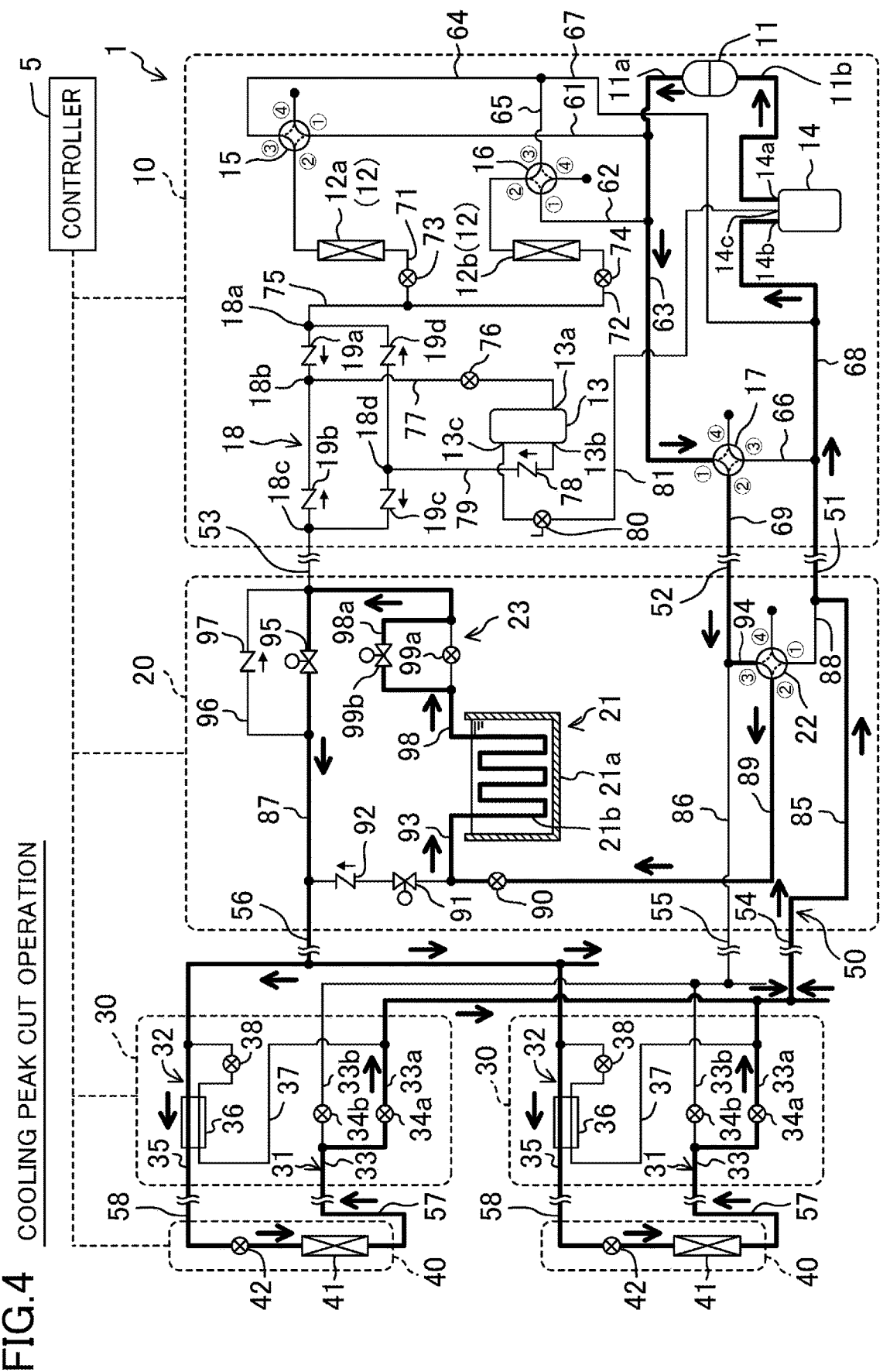
FIG. 4 is a diagram illustrating a flow of the refrigerant during a cooling peak cut operation in the piping system diagram of the air-conditioning system of the first embodiment.

The cooling peak cut operation shown in FIG. 4 is a cooling operation in which the refrigerant circulates in the refrigerant circuit (50) with the thermal storage heat exchanger (21) that has the thermal storage tank (21*a*) in which water is generated serving a radiator, and the indoor heat exchanger (41) serving as an evaporator. In this operation, the outdoor heat exchanger (12) is not used.

During the cooling peak cut operation, the first four-way switching valve (15) and the second four-way switching valve (16) in the outdoor unit (10) are set to the second mode, and the third four-way switching valve (17) is set to the first mode. The outdoor-side first expansion valve (73) and the outdoor-side second expansion valve (74) are closed.

In the thermal storage unit (20), the fourth four-way switching valve (22) is set to the second mode, the thermal storage-side first flow rate regulating valve (90) is open, and the thermal storage-side first open/close valve (91) is closed. The thermal storage-side second open/close valve (95) and the thermal storage-side third open/close valve (99*b*) are open, and the thermal storage-side flow rate regulating valve (99*a*) is closed. The valves in the flow path switching unit (30) and the indoor unit (40) are controlled in the same manner as in the cooling operation and the cooling peak shift operation.

During the cooling peak cut operation, the refrigerant discharged from the compressor (11) does not flow into the first outdoor heat exchanger (12*a*) and the second outdoor heat exchanger (12*b*), but flows through the third four-way switching valve (17) and the fourth four-way switching valve (22), and flows into the thermal storage heat exchanger (21) to dissipate heat. The refrigerant that has been condensed or cooled in the thermal storage heat exchanger (21) passes through the thermal storage-side third open/close valve (99*b*) and the thermal storage-side second open/close valve (95) to flow out of the thermal storage unit (20), and flows into each indoor unit (40) through each flow path switching unit (30).

The refrigerant is decompressed by the indoor expansion valve (42), and then evaporates in the indoor heat exchanger (41). At that time, the indoor air is cooled and the indoor space is cooled. The refrigerant that has been evaporated in the indoor heat exchanger (41) passes through the gas-side connection pipe (31) of the flow path switching unit (30) and the thermal storage-side first gas pipe (85) of the thermal storage unit (20), and returns to the outdoor unit (10). The refrigerant that has returned to the outdoor unit (10) is sucked into the compressor (11) via the accumulator (14).

As shown in FIG. 11 illustrating the P-h diagram of the cooling peak cut operation, in this mode, the difference between high and low pressure of the refrigerant is significantly smaller than in the cooling operation, and the enthalpy difference is larger than in the cooling operation. In this way, in the cooling peak cut operation, the refrigeration cycle in which the high pressure is extremely low is performed, the difference between high and low pressure is small, and thus a small input of the compressor (11) is sufficient. Therefore, the power consumption is reduced and the coefficient of performance (COP) is high, as compared to the normal cooling operation and the cooling peak shift operation.

Cooling/Cold Thermal Storage Operation

Figure 5:
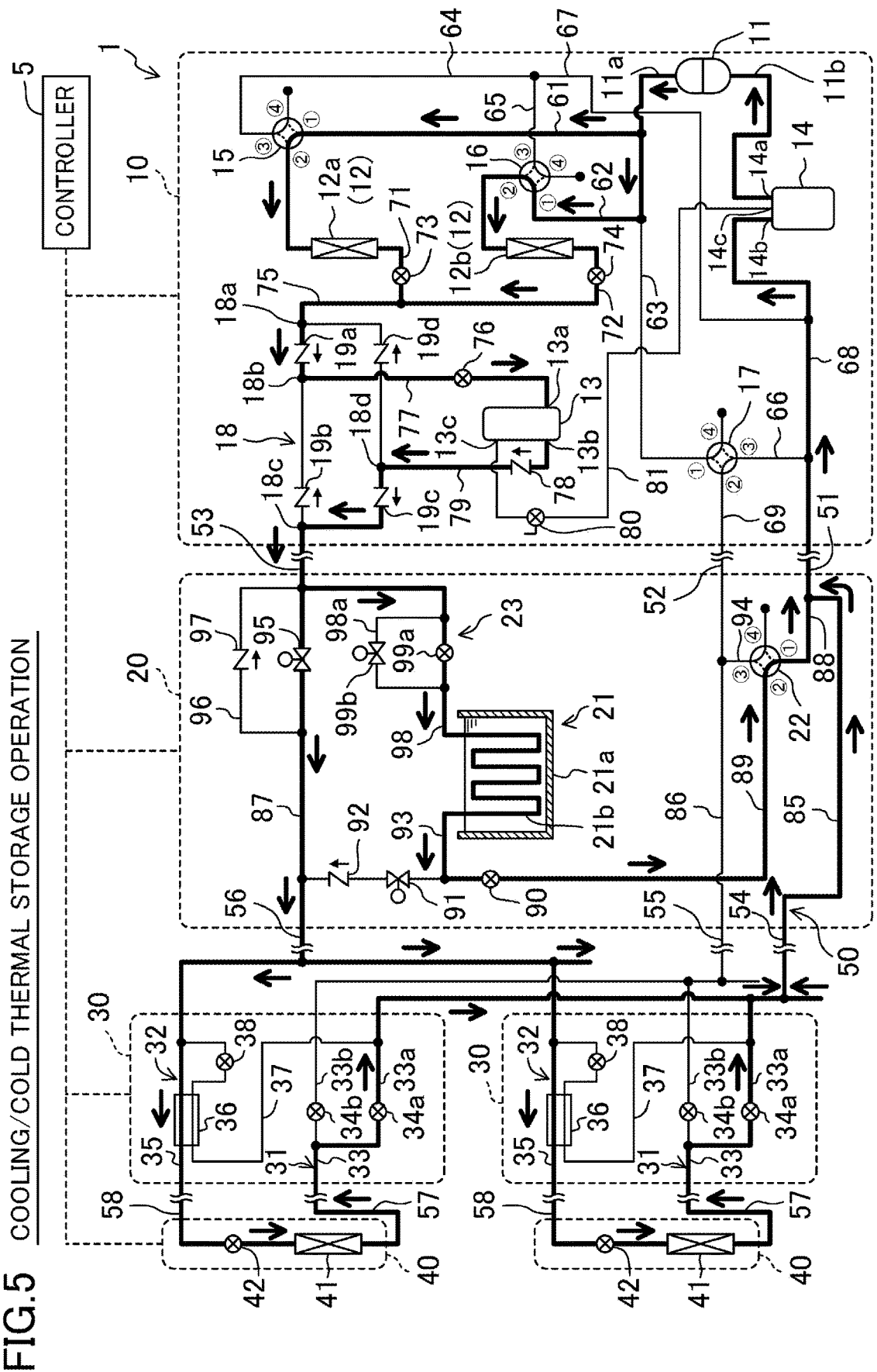
FIG. 5 is a diagram illustrating a flow of the refrigerant during a cooling/cold thermal storage operation in the piping system diagram of the air-conditioning system of the first embodiment.

The cooling/cold thermal storage operation shown in FIG. 5 is an operation in which water in the thermal storage tank (21*a*) is cooled using the thermal storage heat exchanger (21) as an evaporator to store cold thermal energy while the cooling operation shown in FIG. 2 is performed.

In the cooling/cold thermal storage operation, all valves are in the same position as in the cooling operation shown in FIG. 2, except that, in the thermal storage unit (20), the opening degree of the thermal storage-side flow rate regulating valve (99*a*) is appropriately adjusted, the thermal storage-side third open/close valve (99*b*) is closed, the thermal storage-side first flow rate regulating valve (90) is open, and the thermal storage-side first open/close valve (91) is closed.

During the cooling/cold thermal storage operation, the refrigerant discharged from the compressor (11) dissipates heat in the first outdoor heat exchanger (12a) and the second outdoor heat exchanger (12b), and the condensed or cooled refrigerant flows into the receiver (13). The refrigerant flowing out of the receiver (13) passes through the thermal storage-side liquid pipe (87) of the thermal storage unit (20). Then, the refrigerant is subcooled in the flow path switching unit (30), and flows into the indoor unit (40).

In the indoor unit (40), the refrigerant is decompressed by the indoor expansion valve (42), absorbs heat from indoor air in the indoor heat exchanger (41), and evaporates. At this time, the indoor air is cooled and the indoor space is cooled. The refrigerant that has flowed out of the indoor unit (40) flows through the gas-side connection pipe (31) of the flow path switching unit (30) and the thermal storage-side first gas pipe (85) of the thermal storage unit (20).

On the other hand, a part of the refrigerant flowing through the thermal storage-side liquid pipe (87) branches into the thermal storage-side second branch pipe (98), is decompressed by the thermal storage-side flow rate regulating valve (99a), flows into the thermal storage heat exchanger (21), and evaporates. The evaporated refrigerant passes through the second connection pipe (89) and the first connection pipe (88) and merges with the refrigerant in the thermal storage-side first gas pipe (85).

The refrigerant flowing in the thermal storage-side first gas pipe (85) returns to the outdoor unit (10) through the outdoor-side first gas communication pipe (51). The refrigerant flows from the outdoor-side first gas pipe (68) of the outdoor unit (10) into the accumulator (14), and then is sucked into the compressor (11).

Cold Thermal Storage Operation

Figure 6:
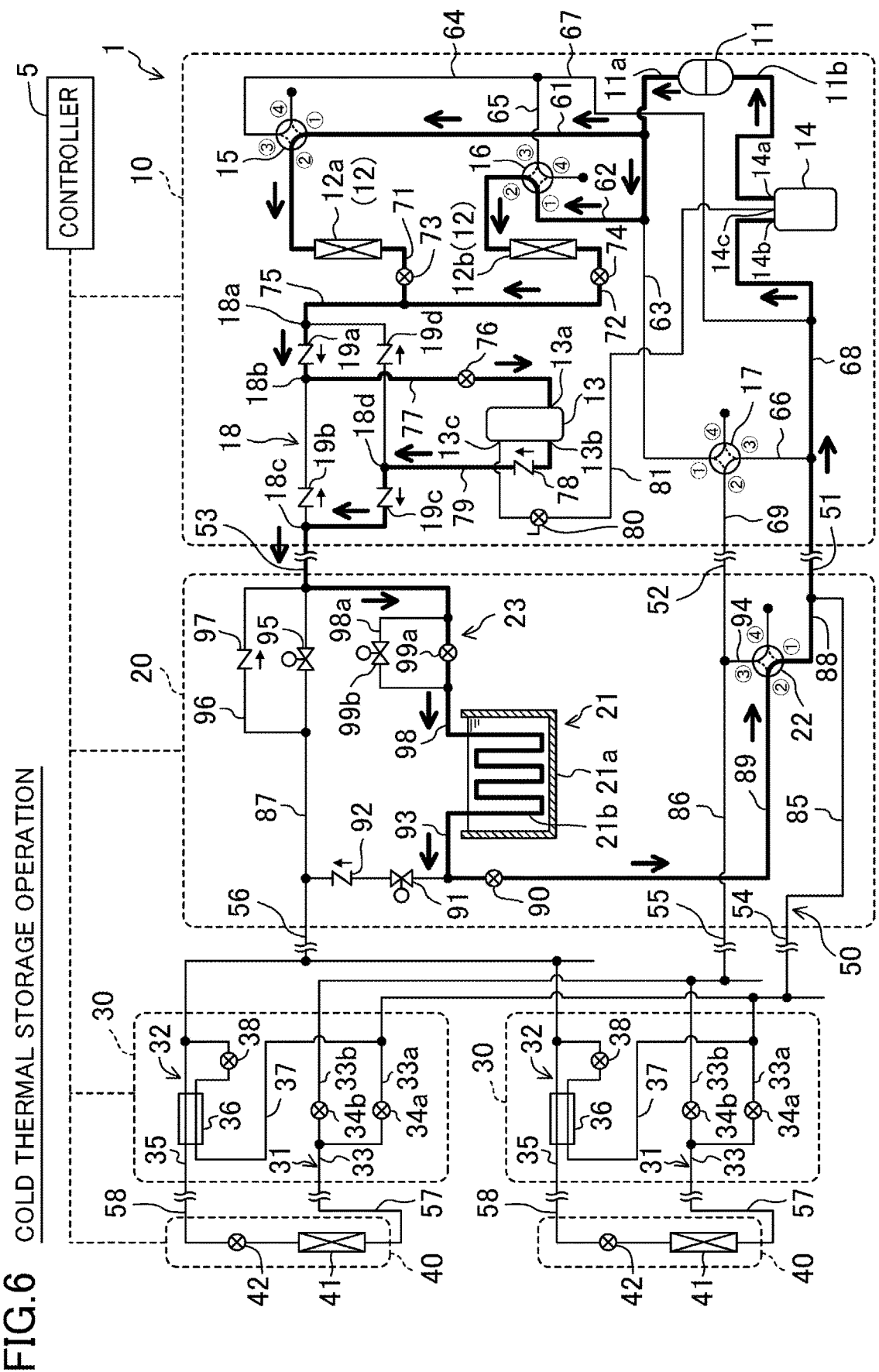
FIG. 6 is a diagram illustrating a flow of the refrigerant during a cold thermal storage operation in the piping system diagram of the air-conditioning system of the first embodiment.

The cold thermal storage operation shown in FIG. 6 is an operation in which water in the thermal storage tank (21a) is cooled by using the outdoor heat exchanger (12) as a radiator and the thermal storage heat exchanger (21) as an evaporator.

In the cold thermal storage operation, the valves in the outdoor unit (10) are controlled in the same manner as in the cooling/cold thermal storage operation shown in FIG. 5. In the thermal storage unit (20), the valves may be controlled in the same manner as in the cooling/cold thermal storage operation, except that the thermal storage-side second open/close valve (95) is closed to substantially prevent the refrigerant from flowing to the flow path switching unit (30) and the indoor unit (40).

During the cold thermal storage operation, the refrigerant discharged from the compressor (11) dissipates heat in the first outdoor heat exchanger (12a) and the second outdoor heat exchanger (12b), and the condensed or cooled refrigerant flows into the receiver (13). The refrigerant that has flowed out of the receiver (13) flows into the thermal storage-side second branch pipe (98), is decompressed by the thermal storage-side flow rate regulating valve (99a), and evaporates in the thermal storage heat exchanger (21).

The evaporated refrigerant passes through the second connection pipe (89) and the first connection pipe (88), and flows into the thermal storage-side first gas pipe (85). The refrigerant flowing in the thermal storage-side first gas pipe (85) returns to the outdoor unit (10) through the outdoor-side first gas communication pipe (51). The refrigerant flows from the outdoor-side first gas pipe (68) of the outdoor unit (10) into the accumulator (14), and then is sucked into the compressor (11).

Heating Operation

Figure 7:
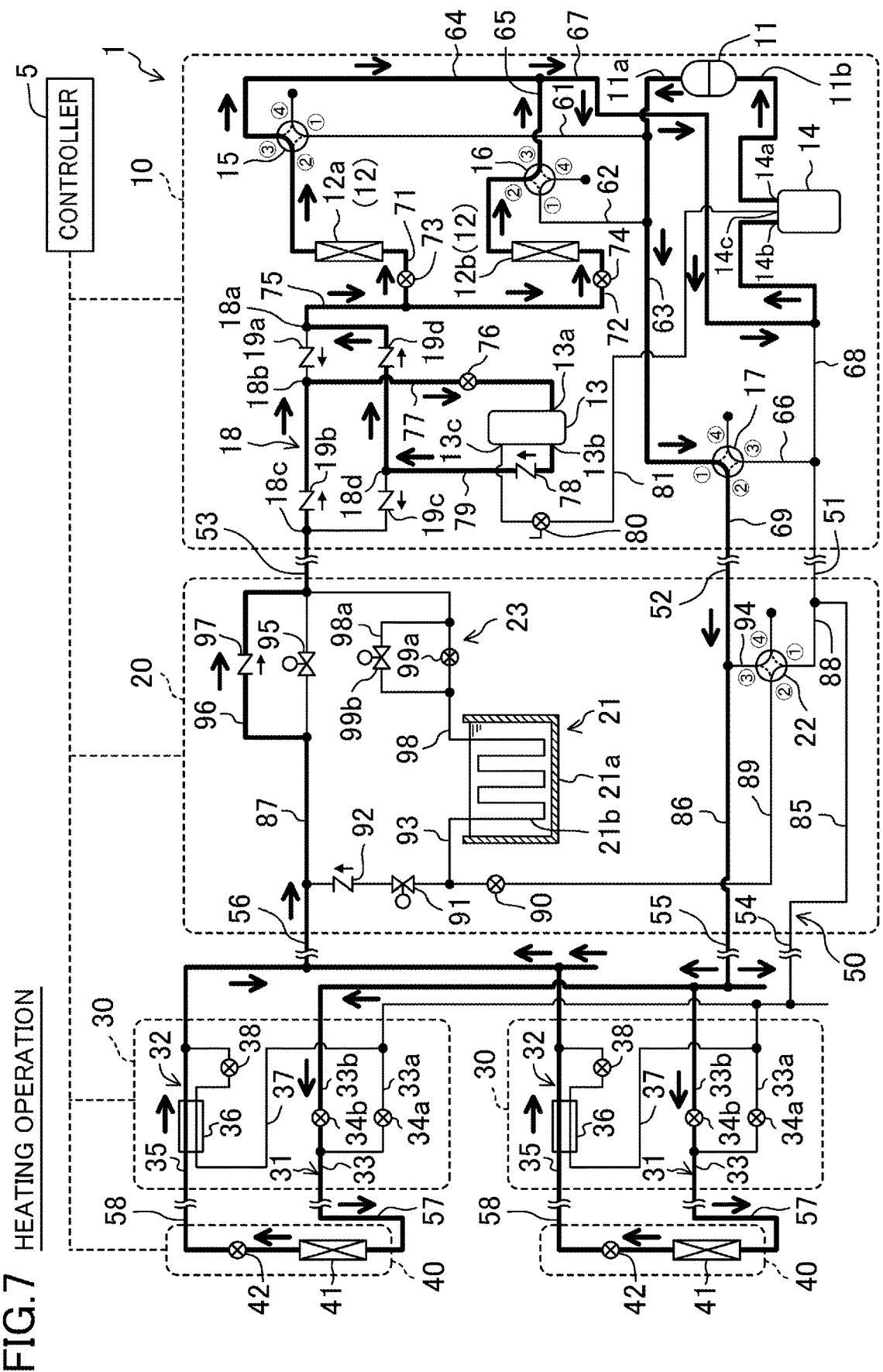
FIG. 7 is a diagram illustrating a flow of the refrigerant during a heating operation in the piping system diagram of the air-conditioning system of the first embodiment.

The heating operation shown in FIG. 7 is an operation in which the refrigerant circulates in the refrigerant circuit (50) with the indoor heat exchanger (41) serving as a radiator and the outdoor heat exchanger (12) serving as an evaporator without use of the thermal storage heat exchanger (21).

During the heating operation, the first four-way switching valve (15) and the second four-way switching valve (16) in the outdoor unit (10) are set to the second mode. Both the outdoor-side first expansion valve (73) and the outdoor-side second expansion valve (74) are controlled to open to a predetermined opening degree. However, if the operation is performed by only one outdoor heat exchanger (12), one of the outdoor-side first expansion valve (73) and the outdoor-side second expansion valve (74) is closed (this also applies to each operation described below). The outdoor flow rate regulating valve (76) is set to fully open.

In the thermal storage unit (20), the thermal storage-side second open/close valve (95) is closed, and the thermal storage-side flow rate regulating valve (99a) and the thermal storage-side third open/close valve (99b) are closed.

In the flow path switching unit (30), if the heating operation is performed in each indoor unit (40), the first flow path switching valve (34a) is closed, the second flow path switching valve (34b) is open, and the flow rate regulating valve is closed. In the indoor unit (40), the indoor expansion valve (42) is controlled to fully open.

During the heating operation, the refrigerant that has been discharged from the compressor (11) passes through the third four-way switching valve (17) and through the thermal storage-side second gas pipe (86) of the thermal storage unit (20), then passes through the gas-side connection pipe (31) of the flow path switching unit (30), and flows into the indoor unit (40). The refrigerant dissipates heat in the indoor heat exchanger (41). Then, the condensed or cooled refrigerant flows out of the indoor unit (40), flows through the liquid-side connection pipe (32) of the flow path switching unit (30), and flows from the intermediate portion liquid communication pipe (56) into the thermal storage unit (20). The refrigerant flows out of the thermal storage-side liquid pipe (87) of the thermal storage unit (20), passes through the first bypass passage (96), and returns to the outdoor unit (10) from the outdoor-side liquid communication pipe (53).

The refrigerant flows into the receiver (13) through the liquid inflow pipe (77), and then flows out to the liquid outflow pipe (79). The refrigerant passes through the bridge circuit (18), is decompressed by the outdoor-side first expansion valve (73) and the outdoor-side second expansion valve (74), and then evaporates in the first outdoor heat exchanger (12a) and the second outdoor heat exchanger (12b). The evaporated refrigerant passes through the outdoor low-pressure pipe (67), flows into the accumulator (14), and is sucked into the compressor (11).

Heating Peak Cut Operation

Figure 8:
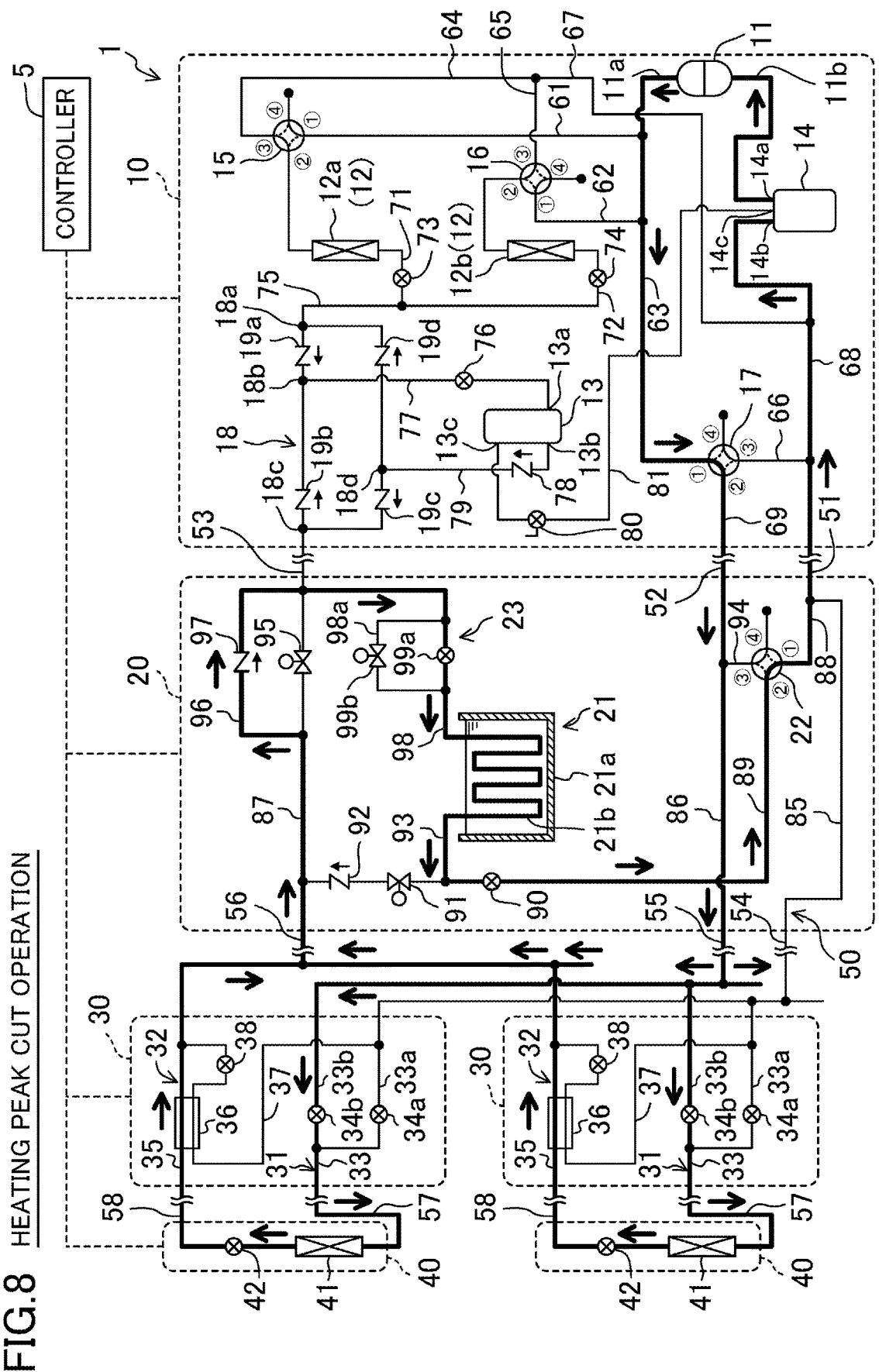
FIG. 8 is a diagram illustrating a flow of the refrigerant during a heating peak cut operation in the piping system diagram of the air-conditioning system of the first embodiment.

The heating peak cut operation shown in FIG. 8 is an operation in which the refrigerant circulates in the refrigerant circuit (50) with the indoor heat exchanger (41) serving as a radiator and the thermal storage heat exchanger (21) serving as an evaporator without use of the outdoor heat exchanger (12).

During the heating peak cut operation, the first four-way switching valve (15) and the second four-way switching valve (16) in the outdoor unit (10) are set to the second mode, and the third four-way switching valve (17) is set to the first mode. Both the outdoor-side first expansion valve (73) and the outdoor-side second expansion valve (74) are closed.

In the thermal storage unit (20), the thermal storage-side second open/close valve (95) is open, the thermal storage-side flow rate regulating valve (99a) is controlled to open to a predetermined opening degree, and the thermal storage-side third open/close valve (99*b*) is closed. The valves in the flow path switching unit (30) and the indoor unit (40) are controlled in the same manner as in the heating operation.

During the heating peak cut operation, the refrigerant discharged from the compressor (11) passes through the third four-way switching valve (17) and through the thermal storage-side second gas pipe (86) of the thermal storage unit (20), then flows through the gas-side connection pipe (31) of the flow path switching unit (30), and flows into the indoor unit (40). The refrigerant dissipates heat in the indoor heat exchanger (41). Then, the condensed or cooled refrigerant flows out of the indoor unit (40), flows through the liquid-side connection pipe (32) of the flow path switching unit (30), and flows from the intermediate portion liquid communication pipe (56) into the thermal storage unit (20).

The refrigerant flows out of the thermal storage-side liquid pipe (87) of the thermal storage unit (20) and passes through the first bypass passage (96). Further, the refrigerant passes through the thermal storage-side second branch pipe (98), is decompressed by the thermal storage-side flow rate regulating valve (99*a*), absorbs heat from water stored inside the thermal storage tank (21*a*) in the thermal storage heat exchanger (21), and evaporates.

The evaporated refrigerant passes through the second connection pipe (89) and the first connection pipe (88). The refrigerant flowing in the first connection pipe (88) returns to the outdoor unit (10) through the outdoor-side first gas communication pipe (51). The refrigerant flowing in the outdoor-side first gas communication pipe (51) returns to the outdoor unit (10). The refrigerant flows from the outdoor-side first gas pipe (68) of the outdoor unit (10) into the accumulator (14), and then is sucked into the compressor (11).

Heating/Warm Thermal Storage Operation

Figure 9:
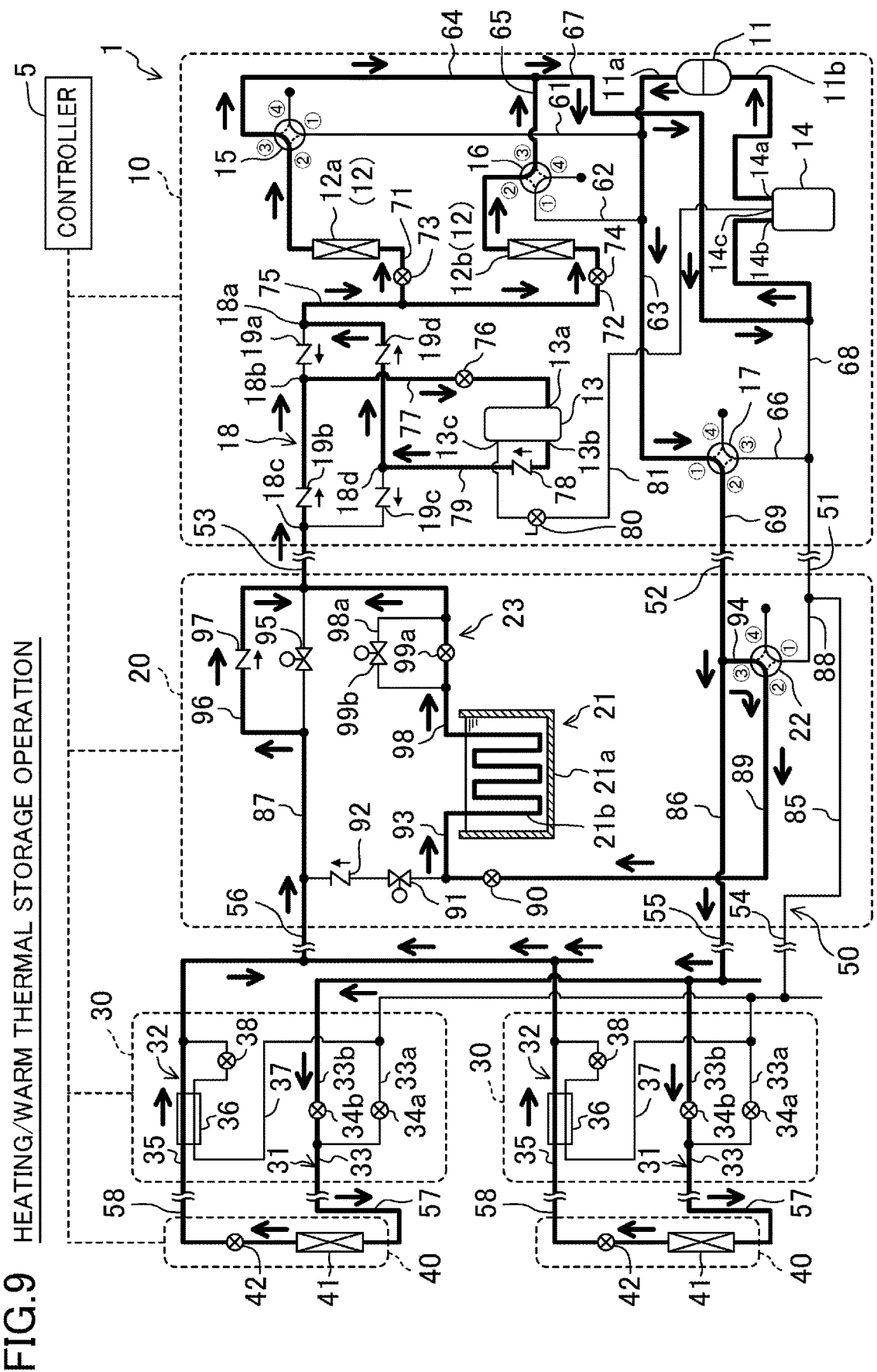
FIG. 9 is a diagram illustrating a flow of the refrigerant during a heating/warm thermal storage operation in the piping system diagram of the air-conditioning system of the first embodiment.

The heating/warm thermal storage operation shown in FIG. 9 is an operation in which water in the thermal storage tank (21*a*) in the thermal storage heat exchanger is heated and warm thermal energy is stored while the heating operation in which the refrigerant circulates in the refrigerant circuit (50) with the indoor heat exchanger (41) serving as a radiator and the outdoor heat exchanger (12) serving as an evaporator is performed.

During the heating/warm thermal storage operation, in the outdoor unit (10), the valves are controlled in the same manner as in the heating operation shown in FIG. 7. In the thermal storage unit (20), the thermal storage-side first flow rate regulating valve (90) is controlled to fully open, and the thermal storage-side first open/close valve (91) is closed. The thermal storage-side second open/close valve (95) and the thermal storage-side third open/close valve (99*b*) are closed, and the thermal storage-side flow rate regulating valve (99*a*) is controlled to open to a predetermined opening degree. The valves of the flow path switching units (30) and the indoor unit (40) are controlled in the same manner as in the heating operation shown in FIG. 7.

During the heating/warm thermal storage operation, the refrigerant discharged from the compressor (11) passes through the third four-way switching valve (17) and the thermal storage-side second gas pipe (86) of the thermal storage unit (20). A part of the refrigerant branches from the fourth four-way switching valve (22) to the second connection pipe (89), and the remaining part of the refrigerant passes through the gas-side connection pipe (31) of the flow path switching unit (30) and flows into the indoor unit (40). The refrigerant dissipates heat in the indoor heat exchanger (41). Then, the condensed or cooled refrigerant flows out of the indoor unit (40), flows through the liquid-side connection pipe (32) of the flow path switching unit (30), and flows from the intermediate portion liquid communication pipe (56) into the thermal storage unit (20). The refrigerant flows out of the thermal storage-side liquid pipe (87) of the thermal storage unit (20) and flows through the first bypass passage (96).

The refrigerant that has branched from the thermal storage-side second gas pipe (86) through the fourth four-way switching valve (22) into the second connection pipe (89) flows into the thermal storage heat exchanger (21) and dissipates heat into the water in the thermal storage tank (21*a*), and heats the water so that the warm thermal energy may be stored. The refrigerant that has dissipated heat in the thermal storage heat exchanger (21) flows into the thermal storage-side liquid pipe (87) through the thermal storage-side second branch pipe (98), in the thermal storage-side liquid pipe (87), merges with the refrigerant that flowed through the first bypass passage (96), and then flows from the outdoor-side liquid communication pipe (53) into the outdoor unit (10).

The refrigerant that has flowed into the outdoor unit (10) flows into the receiver (13) through the liquid inflow pipe (77), and then flows out to the liquid outflow pipe (79). The refrigerant passes through the bridge circuit (18) and through the outdoor-side first expansion valve (73) and the outdoor-side second expansion valve (74). Then, the refrigerant evaporates in the first outdoor heat exchanger (12*a*) and the second outdoor heat exchanger (12*b*). The evaporated refrigerant passes through the outdoor low-pressure pipe (67), flows into the accumulator (14), and then is sucked into the compressor (11).

Warm Thermal Storage Operation

Figure 10:
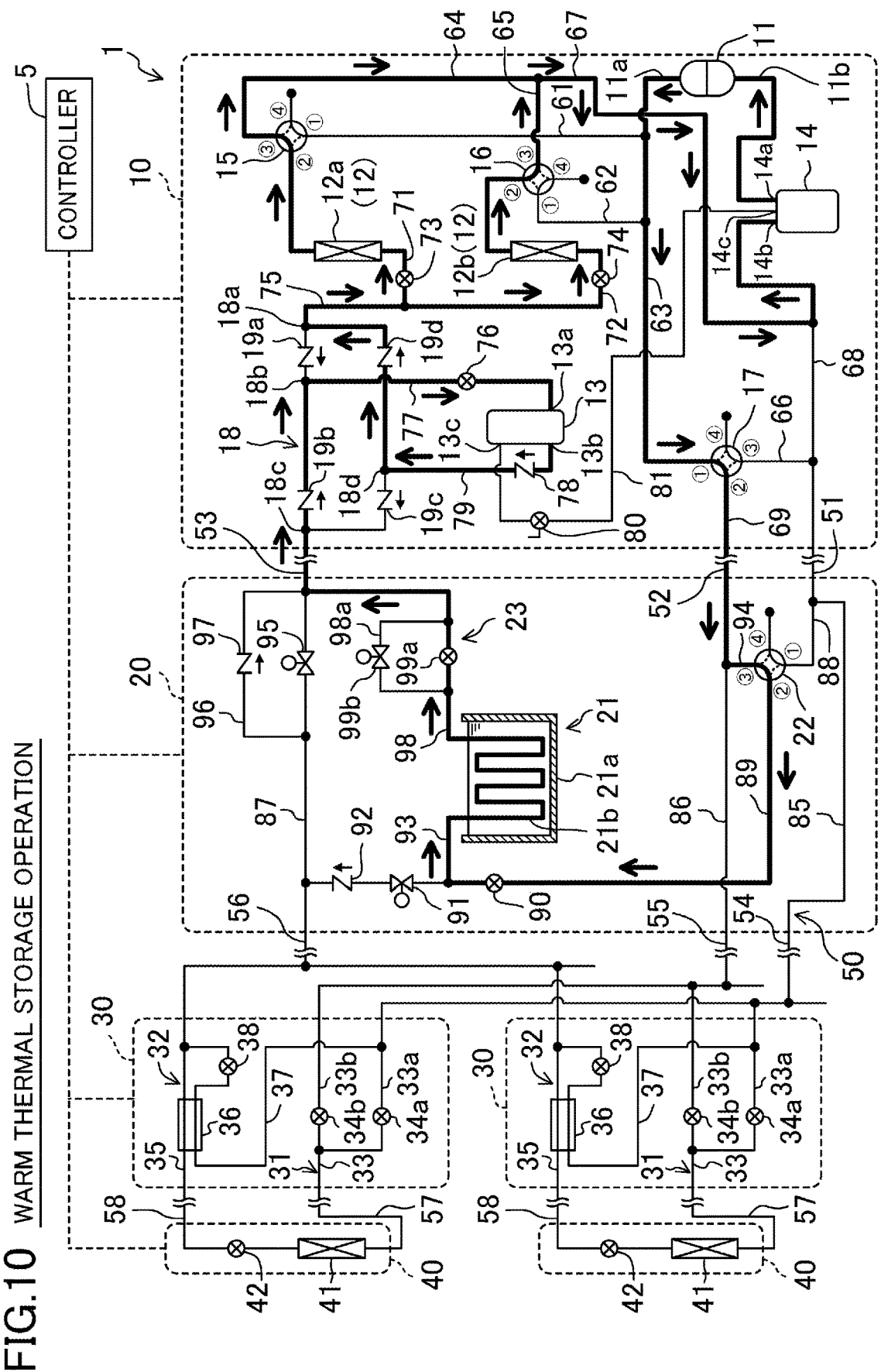
FIG. 10 is a diagram illustrating a flow of the refrigerant during a warm thermal storage operation in the piping system diagram of the air-conditioning system of the first embodiment.

The warm thermal storage operation shown in FIG. 10 is an operation in which the refrigerant circulates in the refrigerant circuit (50) and the warm thermal energy is stored in the thermal storage heat exchanger with the thermal storage heat exchanger serving as a radiator and the outdoor heat exchanger (12) serving as an evaporator without use of the indoor heat exchanger (41).

During the warm thermal storage operation, in the outdoor unit (10), the valves are controlled in the same manner as in the heating operation shown in FIG. 7. In the thermal storage unit (20), the thermal storage-side first flow rate regulating valve (90) is controlled to fully open, and the thermal storage-side first open/close valve (91) is closed. The thermal storage-side second open/close valve (95) and the thermal storage-side third open/close valve (99*b*) are closed, and the thermal storage-side flow rate regulating valve (99*a*) is controlled to open to a predetermined opening degree. In the flow path switching unit (30) and the indoor unit (40), at least one of the first flow path switching valve (34*a*) or the outdoor expansion valve is closed, and the flow of the refrigerant in the indoor heat exchanger (41) is blocked.

During the warm thermal storage operation, the refrigerant discharged from the compressor (11) passes through the third four-way switching valve (17) and the thermal storage-side second gas pipe (86) of the thermal storage unit (20), then flows from the fourth four-way switching valve (22) to the second connection pipe (89). The refrigerant flows into the thermal storage heat exchanger (21) and dissipates heat into the water in the thermal storage tank (21*a*), and heats the water so that the warm thermal energy may be stored. The refrigerant that has dissipated heat in the thermal storage heat exchanger (21) flows into the thermal storage-side liquid pipe (87) through the thermal storage-side second branch pipe (98), and then flows from the outdoor-side liquid communication pipe (53) into the outdoor unit (10).

The refrigerant that has flowed into the outdoor unit (10) flows into the receiver (13) through the liquid inflow pipe (77), and then flows out to the liquid outflow pipe (79). The refrigerant passes through the bridge circuit (18) and through the outdoor-side first expansion valve (73) and the outdoor-side second expansion valve (74). Then, the refrigerant evaporates in the first outdoor heat exchanger (12a) and the second outdoor heat exchanger (12b). The evaporated refrigerant passes through the outdoor low-pressure pipe (67), flows into the accumulator (14), and then is sucked into the compressor (11).

Details of Controller and the Like

Figure 12:
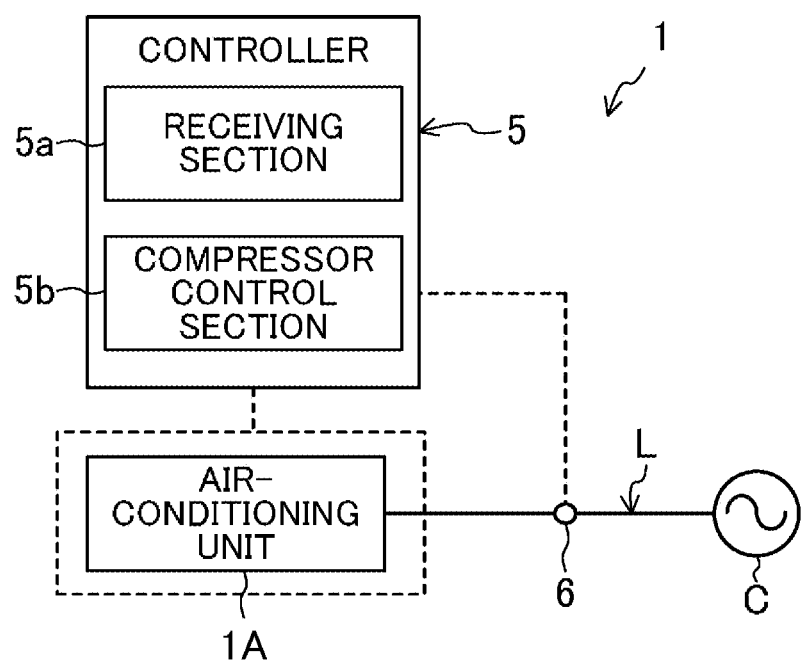
FIG. 12 is a schematic configuration diagram illustrating a relationship between an air-conditioning unit, a controller, and a commercial power source of the first embodiment.

As illustrated in FIG. 12, the air-conditioning system (1) of the present embodiment includes an air-conditioning unit (1A) and the above-mentioned controller (5). The air-conditioning unit (1A) includes the outdoor unit (10), the thermal storage unit (20), the plurality of flow path switching units (30), and the plurality of indoor units (40). The air-conditioning unit (1A) is connected to a commercial power source (C) via a predetermined power supply line (L).

The power supply line (L) is provided with a power detector (6) for detecting commercial power consumption in the entire system in the air-conditioning unit (1A).

The controller (5) is configured to switch the plurality of above-mentioned operations by controlling a flow path switching mechanism. The flow path switching mechanism is configured to switch the flow paths of the refrigerant in the refrigerant circuit (50). Specifically, the flow path switching mechanism is configured as the plurality of above-mentioned valves connected to the refrigerant circuit (50), and includes, for example, an open/close valve, a four-way switching valve, a check valve, a flow rate control valve, and an expansion valve. The controller (5) can change the flow paths of the refrigerant as shown in FIGS. 2 to 10 and switch the plurality of above-mentioned operations by controlling the flow path switching mechanism.

The above-described operations are executed in the cooling mode and the heating mode. The cooling mode includes an operation executed to cool the indoor space in summer, for example. Specifically, the cooling mode includes the cooling operation, the cooling peak shift operation (subcooling operation), the cooling peak cut operation, the cooling/cold thermal storage operation, and the cold thermal storage operation. The heating mode includes an operation executed to heat the indoor space in winter, for example. Specifically, the heating mode includes the heating operation, the heating peak cut operation, the heating/warm thermal storage operation, and the warm thermal storage operation.

The controller (5) is provided with a receiving section (5a) and a compressor control section (5b). The receiving section (5a) receives a signal from, e.g., a power supplier. The signal includes a reduction command that is a first signal and a promotion command that is a second signal. The reduction command is a signal that requires reduction in the commercial power consumption in the entire air-conditioning system (1). The promotion command is a signal that requires promotion in the commercial power consumption in the entire air-conditioning system (1).

When the receiving section (5a) receives the reduction command, the controller (5) controls the air conditioning unit (1A) such that the air-conditioning unit (1A) performs a first operation for reducing the commercial power consumption. The first operation allows the indoor heat exchanger (41) to perform air conditioning using the thermal storage heat exchanger (21) as a heat source. When the air-conditioning system (1) is in the cooling mode, the first operation is the cooling peak cut operation. That is, when the receiving section (5a) receives the reduction command during an operation in the cooling mode, the controller (5) controls the air-conditioning unit (1A) to execute the cooling peak cut operation. When the air-conditioning system (1) is in the heating mode, the first operation is the heating peak cut operation. That is, when the receiving section (5a) receives the promotion command during an operation in the heating mode, the controller (5) controls the air-conditioning unit (1A) to execute the heating peak cut operation.

When the receiving section (5a) receives the promotion command, the controller (5) controls the air conditioning unit (1A) such that the air-conditioning unit (1A) performs a second operation for promoting the commercial power consumption. The second operation allows the indoor heat exchanger (41) to perform air conditioning while allowing the thermal storage heat exchanger (21) to storing thermal energy. When the air-conditioning system (1) is in the cooling mode, the second operation is the cooling/cold thermal storage operation. That is, when the receiving section (5a) receives the promotion command during an operation in the cooling mode, the controller (5) controls the air-conditioning unit (1A) to execute the cooling/cold thermal storage operation. When the air-conditioning system (1) is in the heating mode, the second operation is the heating/warm thermal storage operation. That is, when the receiving section (5a) receives the promotion command during an operation in the heating mode, the controller (5) controls the air-conditioning unit (1A) to execute the heating/warm thermal storage operation.

At the start of the first operation (i.e., the cooling peak cut operation and the heating peak cut operation), the compressor control section (5b) performs a control (first control) reducing the commercial power consumption to a predetermined target value (first value) or lower. That is, in the first control, the compressor (11) is controlled such that the commercial power consumption is made equal to or lower than the first value. At the start of the second operation (i.e., the cooling/cold thermal storage operation and the heating/hot thermal storage operation), the compressor control section (5b) performs a control (third control) promoting the commercial power consumption to a predetermined target value (third value) or higher. That is, in the third control, the compressor (11) is controlled such that the commercial power consumption is made equal to or higher than the third value.

In the first embodiment, the compressor (11) and the controller (5) (control device) constitute a power reduction section that reduces the commercial power consumption in the entire system to the first value or lower at the start of the first operation. In the first embodiment, the compressor (11) and the controller (5) constitute a power promotion section that promotes the commercial power consumption in the entire system to the third value or higher at the start of the second operation.

Problem of First Operation

For example, in the cooling mode, when the receiving section (5a) receives the reduction command, a certain operation is shifted into the cooling peak cut operation. The cooling peak cut operation allows for reduction in the commercial power consumption in the entire system since the cold thermal energy stored in the thermal storage tank (21a) is used for cooling.

On the other hand, right after a certain operation is shifted into the cooling peak cut operation, the flow of the refrigerant is switched, and thus a certain period of time is required for the refrigeration cycle to reach a steady state. As a consequence, even though the receiving section (5a) receives the reduction command, the commercial power consumption cannot be quickly reduced, and it may exceed the target value (also referred to as a "target commercial power consumption"). When the commercial power consumption exceeds the target value in such a period, it is impossible to respond to the request of, e.g., the power supplier. The same problem also occurs at the start of the heating peak cut operation. In addition, this problem also occurs when the air-conditioning unit (1A) being at rest starts the cooling peak cut operation or the heating peak cut operation.

Particularly, at the start of the cooling peak cut operation, the high-pressure gas refrigerant that has been compressed in the compressor (11) is supplied to the thermal storage heat exchanger (21). Here, during other operations performed right before the cooling peak cut operation, if the refrigerant accumulates inside the thermal storage heat exchanger (21) as a liquid refrigerant, quite a long time is required to push out the liquid refrigerant with the high-pressure gas refrigerant. Thus, it takes time until the refrigeration cycle of the cooling peak cut operation reaches a steady state, and in some cases, it is impossible to sufficiently respond to the request to reduce the commercial power consumption. Thus, such a problem is remarkable at the start of the cooling peak cut operation.

Control at Start of First Operation

In the present embodiment, focusing on the above-described problem of the first operation, the following control is performed at the start of the first operation. The control will be described with reference to FIGS. 13 and 14. Here, the control at the start of the first operation in the cooling mode will be described in detail.

Figure 13:
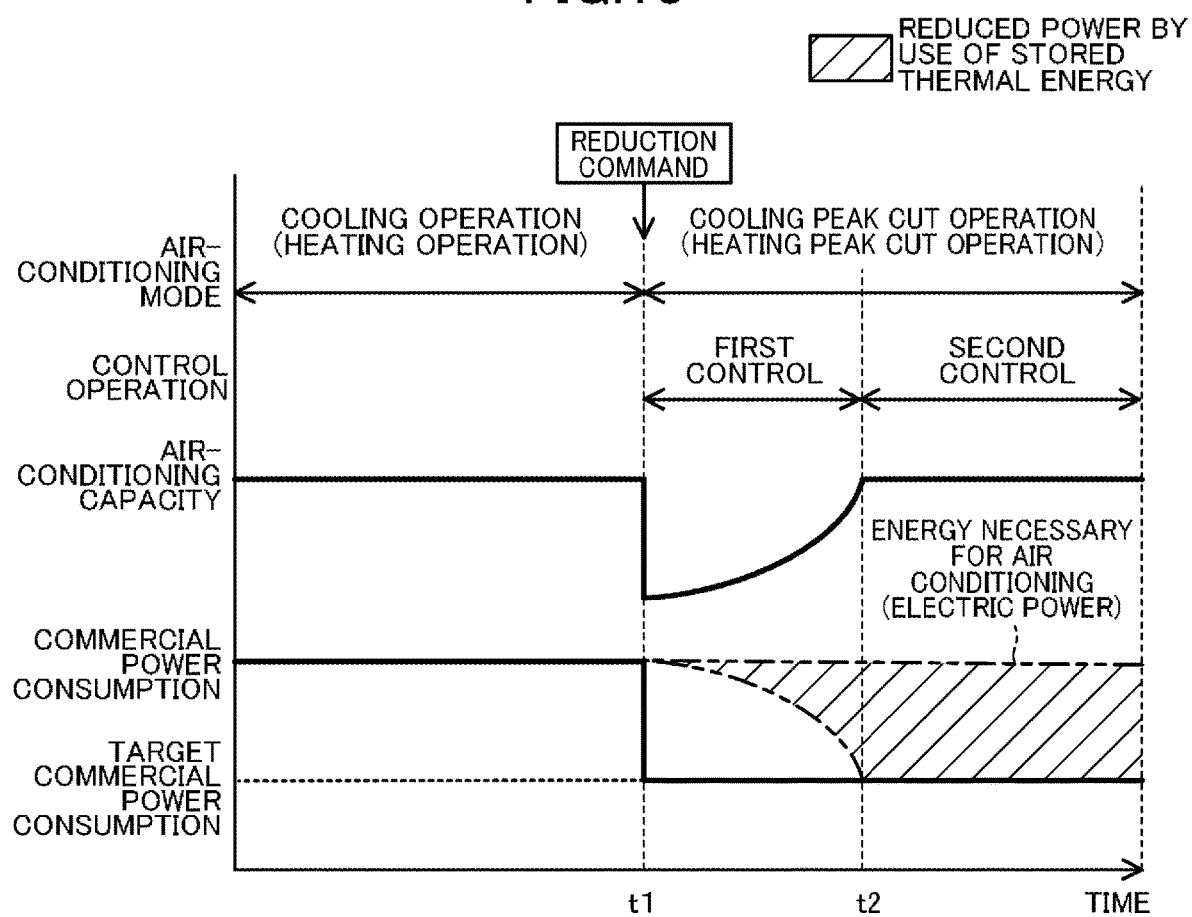
FIG. 13 is a time chart schematically illustrating a change in an air-conditioning capacity and the commercial power consumption in a first operation of the first embodiment.
Figure 14:
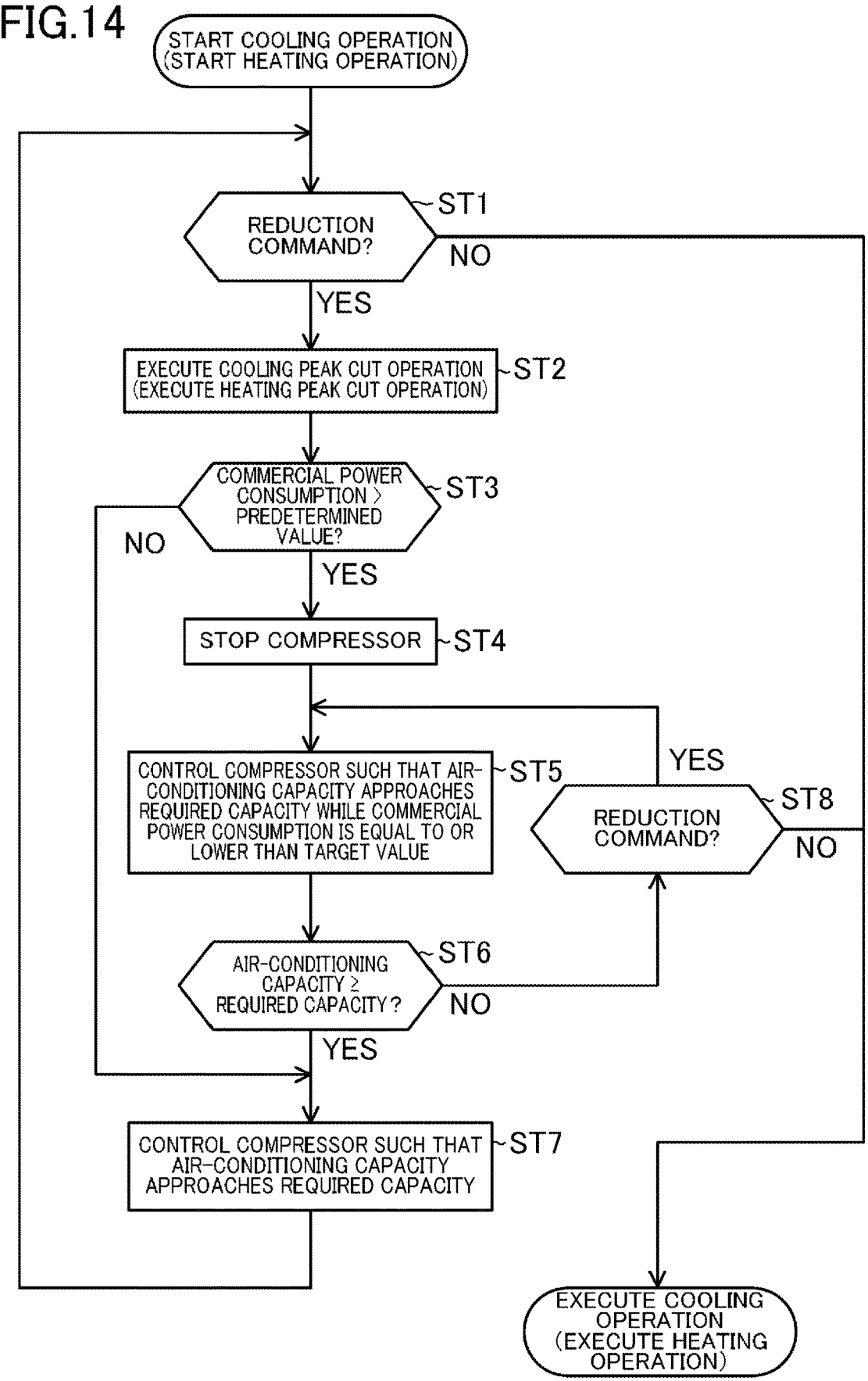
FIG. 14 is a flowchart of the first operation of the first embodiment.

As shown in FIG. 13, in the cooling operation, the air-conditioning unit (1A) is controlled to achieve a predetermined air-conditioning capacity (here, the cooling capacity) in the indoor unit (40) (indoor heat exchanger (41)). Here, the air-conditioning capacity of the indoor unit (40) is determined on the basis of, for example, a set temperature in the cooling mode and an indoor temperature (e.g., the temperature of the intake air). For example, suppose that, during the cooling operation, the receiving section (5a) receives the reduction command at time t1 in FIG. 13. In this case, the process proceeds from Step ST1 to Step ST2 in FIG. 14, and the cooling operation switches to the cooling peak cut operation.

The target commercial power consumption (first value) in the air-conditioning unit (1A) is preset when the reduction command is received. The target commercial power consumption is set to a value that can be sufficiently satisfied if the refrigeration cycle of the cooling peak cut operation reaches a steady state. On the opposite, in a situation where the cooling peak cut operation simply starts right after the reduction command is received, the commercial power consumption may exceed the target commercial power consumption during the time until the refrigeration cycle reaches the steady state.

Thus, in Step ST3, if the commercial power consumption detected by the power detector (6) exceeds a predetermined value (second value), the process proceeds to the first control in Steps ST4 and ST5. The predetermined value may be the same as the target commercial power consumption (first value) in the cooling peak cut operation, or may be a predetermined value lower than the first value. On the other hand, in Step ST3, if the commercial power consumption is equal to or lower than the predetermined value (second value), the process proceeds to Step ST7, and the second control is performed. The second control brings the air-conditioning capacity close to the required capacity without taking the commercial power consumption into account, and may be defined as the same as, for example, normal control of the cooling operation. The determination of Step ST3 may be omitted and the process may proceed to Step ST4 at any time when the cooling peak cut operation is started in Step ST2. Alternatively, after the determination in Step ST3, Step ST4 may be omitted and the process may proceed to Step ST5.

When the first control is executed, first, the compressor control section (5b) stops the compressor (11) in Step ST4. Thus, the commercial power consumption is significantly reduced in synchronization with the timing of the reduction command. Therefore, it is possible to reliably prevent the commercial power consumption from exceeding the target commercial power consumption at the start of the cooling peak cut operation.

Next, when the process proceeds to Step ST5, the compressor (11) is controlled such that the air-conditioning capacity is brought close to the required capacity while the commercial power consumption is made equal to or lower than the target commercial power consumption. This control can be implemented by controlling the number of revolutions of the compressor (11) using, for example, the evaporation temperature of the refrigerant in the indoor unit (40), the target evaporation temperature of the refrigerant decided based on the required capacity, the commercial power consumption detected by the power detector (6), and the target commercial power consumption as the control parameters. Thus, in the first control, as shown in FIG. 13, the air-conditioning capacity of the indoor unit (40) gradually approaches the required capacity, and the refrigeration cycle of the cooling peak cut operation approaches a steady state. Thus, in the cooling peak cut operation, the electric power (the hatched area in FIG. 13) reduced by utilizing the stored thermal energy (cold thermal energy) gradually increases, and the power reduction advantage in the cooling peak cut operation is gradually achieved.

Next, the process proceeds to step ST6. If the air-conditioning capacity does not reach the required capacity, the process proceeds to Step ST8. If the reduction command is canceled in Step ST8, the process returns to the cooling operation. If the reduction command is not canceled, the control of Step ST5 is continuously performed.

Afterward, when the air-conditioning capacity reaches the required capacity at time t2 in FIG. 13, the first control ends, and the second control is executed (Step ST7). In Step ST7, the control (normal control) to bring the air-conditioning capacity close to the required capacity is performed regardless of the commercial power consumption. Therefore, after the process proceeds to Step ST7, the control parameters are reduced and the controllability of the air-conditioning unit (1A) increases.

As described above, at the start of the cooling peak cut operation, the first control for reducing the commercial power consumption in the entire system to the target commercial power consumption or lower is executed. As a result, the power reduction requirement may be reliably satisfied even at the start of the cooling peak cut operation.

Although not shown in detail, the same control as in the cooling peak cut operation is performed in the heating peak cut operation that is the first operation. As a result, the power reduction requirement may be reliably satisfied even at the start of the heating peak cut operation.

Problem of Second Operation

For example, in the cooling mode, when the receiving section (5a) receives the promotion command, a certain operation is shifted into the cooling/cold thermal storage operation, as described above. The cooling/cold thermal storage operation allows for promotion in the commercial power consumption in the entire system since the cooling is performed while the cold thermal energy in the thermal storage tank (21a) is being stored.

On the other hand, right after a certain operation is shifted into the cooling/cold thermal storage operation, the flow of the refrigerant is switched, and thus a certain period of time is required for the refrigeration cycle to reach a steady state. As a consequence, even though the receiving section (5a) receives the promotion command, the commercial power consumption cannot be quickly increased, and it may fall below the target value (also referred to as a "target commercial power consumption"). When the commercial power consumption falls below the target value in such a period, it is impossible to respond to the request of, e.g., the power supplier. The same problem also occurs at the start of the heating/warm thermal storage operation. In addition, this problem also occurs when the air-conditioning unit (1A) being at rest starts the cooling/cold thermal storage operation or the heating/warm thermal storage operation.

Control at Start of Second Operation

In the present embodiment, focusing on the above-described problem of the second operation, the following control is performed at the start of the second operation. The control will be described with reference to FIGS. 15 and 16. Here, the control at the start of the second operation in the cooling mode will be described in detail.

Figure 15:
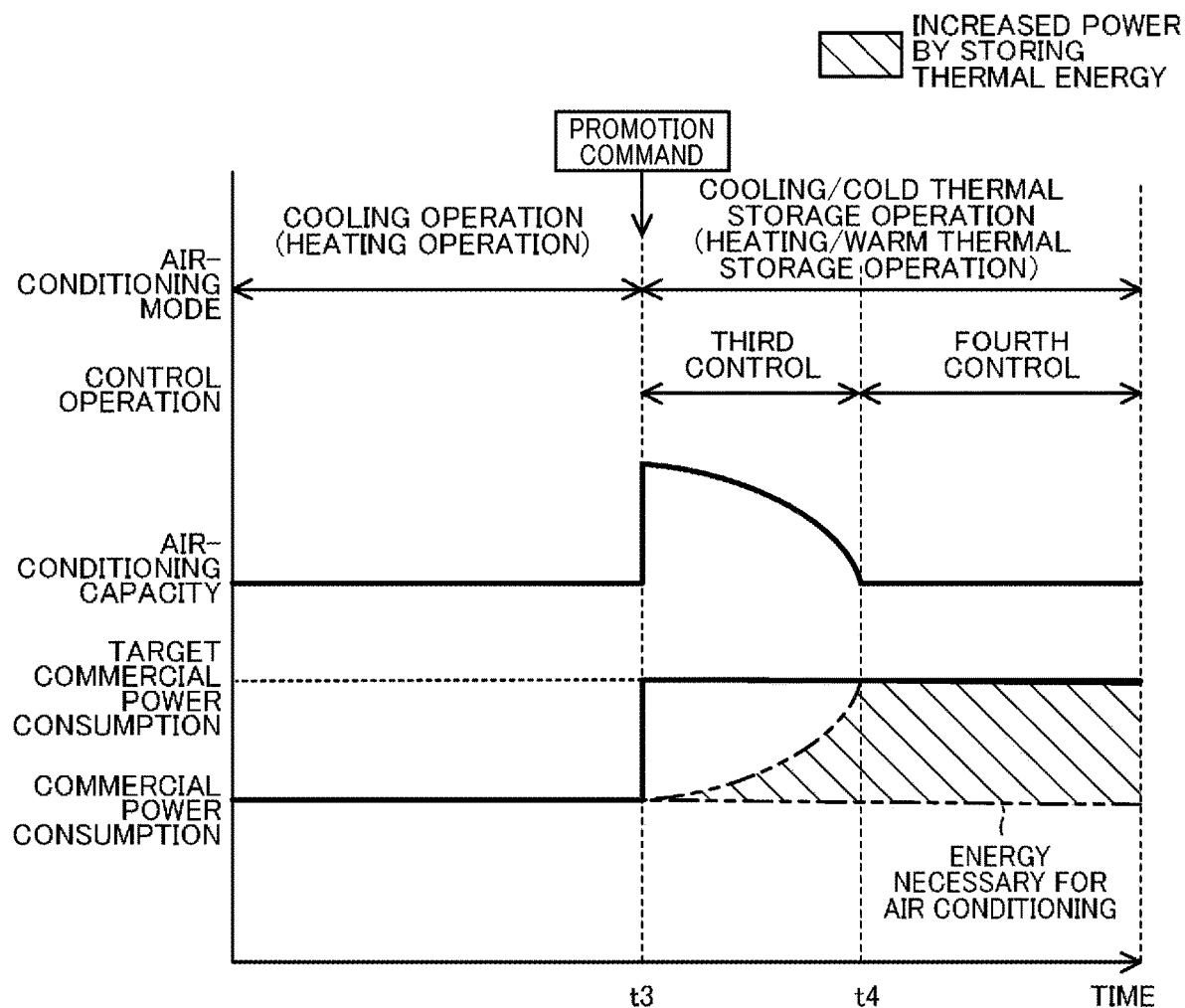
FIG. 15 is a time chart schematically illustrating a change in the air-conditioning capacity and the commercial power consumption in a second operation of the first embodiment.
Figure 16:
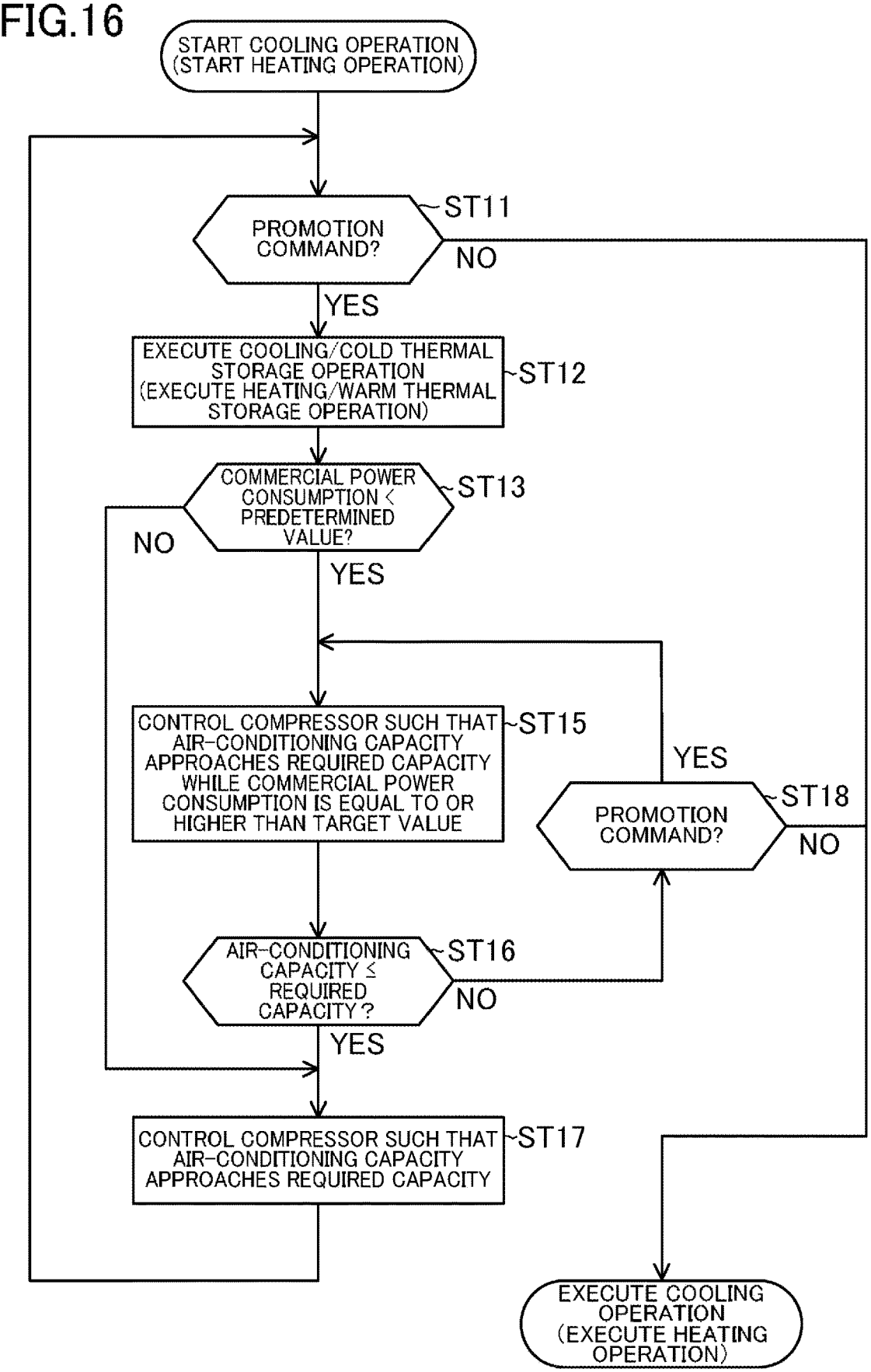
FIG. 16 is a flowchart according to the second operation of the first embodiment.

As shown in FIG. 15, in the cooling operation, the air-conditioning unit (1A) is controlled to achieve a predetermined air-conditioning capacity (here, the cooling capacity) in the indoor unit (40). For example, suppose that, during the cooling operation, the receiving section (5a) receives the promotion command at time t3 in FIG. 15. In this case, the process proceeds from Step ST11 to Step ST12 in FIG. 16, and the cooling operation switches to the cooling/cold thermal storage operation.

The target commercial power consumption (third value) in the air-conditioning unit (1A) is preset when the promotion command is received. The target commercial power consumption is set to a value that can be sufficiently satisfied if the refrigeration cycle of the cooling/cold thermal storage operation is in a steady state. On the opposite, in a situation where the cooling/cold thermal storage operation simply starts right after the promotion command is received, the commercial power consumption may fall below the target commercial power consumption during the time until the refrigeration cycle reaches the steady state.

Thus, in Step ST13, if the commercial power consumption detected by the power detector (6) falls below a predetermined value (fourth value), the process proceeds to the third control in Step ST15. The predetermined value may be the same as the target commercial power consumption (third value) in the cooling/cold thermal storage operation, or may be a predetermined value higher than the third value. On the other hand, in Step ST13, if the commercial power consumption is equal to or higher than the predetermined value (fourth value), the process proceeds to Step ST17, and the fourth control is performed. The fourth control brings the air-conditioning capacity close to the required capacity without taking the commercial power consumption into account, and may be defined as the same as, for example, normal control of the cooling operation. The determination of Step ST13 may be omitted and the process may proceed to Step ST15 at any time when the cooling/cold thermal storage operation is started in Step ST12.

When the third control is executed, the compressor (11) is controlled such that the air-conditioning capacity is brought close to the required capacity while the commercial power consumption is made equal to or higher than the target commercial power consumption power or higher. This control can be implemented by controlling the number of revolutions of the compressor (11) using, for example, the evaporation temperature of the refrigerant in the indoor unit (40), the target evaporation temperature of the refrigerant decided based on the required capacity, the commercial power consumption detected by the power detector (6), and the target commercial power consumption as the control parameters. Thus, in the third control, as shown in FIG. 15, the air-conditioning capacity of the indoor unit (40) gradually approaches the required capacity, and the refrigeration cycle of the cooling/cold thermal storage operation approaches a steady state. Thus, in the cooling/cold thermal storage operation, the electric power (the hatched area in FIG. 15) increased by the storing thermal energy (cold thermal energy) gradually increases, and the power promotion advantage in the cooling/cold thermal storage operation is gradually achieved.

Next, the process proceeds to Step ST16. If the air-conditioning capacity still exceed the required capacity, the process proceeds to Step ST18. If the promotion command is canceled in Step ST18, the process returns to the cooling operation. If the promotion command is not canceled, the control of Step ST15 is continuously performed.

Afterward, when the air-conditioning capacity reaches the required capacity at time t4 in FIG. 15, the third control ends, and the fourth control is executed (Step ST17). In Step ST17, the control (normal control) to bring the air-conditioning capacity close to the required capacity is performed regardless of the commercial power consumption. Therefore, after the process proceeds to step ST17, the control parameters are reduced and the controllability of the air-conditioning unit (1A) increases.

As described above, at the start of the cooling/cold thermal storage operation, the third control for reducing the commercial power consumption in the entire system to the target commercial power consumption or higher is executed. As a result, the power promotion requirement may be reliably satisfied even at the start of the cooling/cold thermal storage operation.

Although not shown in detail, the same control as in the cooling/cold thermal storage operation is performed in the heating/warm thermal storage operation that is the second operation. As a result, the power promotion requirement may be reliably satisfied even at the start of the heating/warm thermal storage operation.

Advantages of First Embodiment

The air-conditioning system (1) of the first embodiment includes the power reduction section performing the first control in synchronization with the timing of the start of the first operation, the first control making the commercial power consumption in the entire system equal to or lower than the first value. This configuration enables the commercial power consumption to be reliably reduced to the target commercial power consumption or lower at the start of the cooling peak cut operation or the heating peak cut operation even before the refrigeration cycle reaches a steady state. Thus, the power reduction requirement of, e.g., the power supplier may be reliably satisfied.

The power reduction section of the first embodiment includes the compressor (11) and the controller (5) (control device), the controller (5) controlling, in the first control, the compressor (11) such that the commercial power consumption in the entire system is made equal to or lower than the first value. This configuration enables the commercial power consumption in the entire system to be easily reduced to the first value or lower by controlling the compressor (11).

In the first control, the controller (5) of the first embodiment controls the compressor (11) such that the air-conditioning capacity of the indoor heat exchanger (41) (utilization-side heat exchanger) is brought close to the required capacity while the commercial power consumption is made equal to or lower than the first value (Step ST5). This configuration enables the refrigeration cycle to approach a steady state while preventing the commercial power consumption from exceeding the first value.

The controller (5) of the first embodiment performs the first control if the commercial power consumption exceeds the second value at the start of the first operation. On the other hand, the controller (5) of the first embodiment performs the second control if the commercial power consumption is equal to or lower than the second value, the second control controlling the compressor (11) such that the air-conditioning capacity of the indoor heat exchanger (utilization-side heat exchanger (41)) is brought close to the required capacity regardless of the commercial power consumption (Step ST7). This configuration enables a quick shift into the second control if the commercial power consumption is sufficiently low at the start of the first operation. The second control improves the controllability of the air-conditioning unit (1A) since it does not take the commercial power consumption into account. Thus, the air-conditioning capacity may be quickly converged to the required capacity.

The controller (5) of the first embodiment stops the compressor (11) at the start of the first control. This configuration enables, in the first control, the commercial power consumption to be reliably and sharply reduced, and to be more efficiently prevented from exceeding the target value.

In the first control, the controller (5) of the first embodiment performs the second control if the air-conditioning capacity of the indoor heat exchanger (41) (utilization-side heat exchanger) reaches the required capacity, the second control controlling the compressor (11) such that the air-conditioning capacity of the indoor heat exchanger (41) is brought close to the required capacity regardless of the commercial power consumption. Shifting to the second control in accordance with these conditions enables a normal capacity control to be performed in the air-conditioning unit (1A) while the commercial power consumption is prevented from exceeding the target value.

The first embodiment includes the power promotion section performing the third control in synchronization with the timing of the start of the second operation, the third control making the commercial power consumption in the entire system equal to or higher than the third value. This configuration enables the commercial power consumption to be reliably the target commercial power consumption or higher at the start of the cooling/cold thermal storage operation or the heating/warm thermal storage operation even before the refrigeration cycle reaches a steady state. Thus, the power promotion requirement of, e.g., the power supplier may be reliably satisfied.

The power promotion section of the first embodiment includes the compressor (11) and the controller (control device), the controller (5) controlling, in the third control, the compressor (11) such that the commercial power consumption in the entire system is made equal to or higher than the third value. This configuration enables the commercial power consumption in the entire system to be easily promoted to the third value or higher by controlling the compressor (11).

In the third control, the controller (5) of the first embodiment controls the compressor (11) such that the air-conditioning capacity of the indoor heat exchanger (41) (utilization-side heat exchanger) is brought close to the required capacity while the commercial power consumption is made equal to or higher than the third value (Step ST15). This configuration enables the refrigeration cycle to approach a steady state while preventing the commercial power consumption from falling below the third value.

The controller (5) of the first embodiment performs the third control if the commercial power consumption falls below the fourth value at the start of the second operation. On the other hand, the controller (5) of the first embodiment performs the fourth control if the commercial power consumption is equal to or higher than the fourth value, the fourth control controlling the compressor (11) is controlled such that the air-conditioning capacity of the utilization-side heat exchanger (41) is brought close to the required capacity regardless of the commercial power consumption (Step ST17). This configuration enables a quick shift into the fourth control if the commercial power consumption is sufficiently high at the start of the second operation. The fourth control is a control that improves the controllability of the air-conditioning unit (1A) since it does not take the commercial power consumption into account. Thus, the air-conditioning capacity may be quickly converged to the required capacity.

In the third control, the controller (5) of the first embodiment performs the fourth control if the air-conditioning capacity of the indoor heat exchanger (41) (utilization-side heat exchanger) reaches the required capacity, the fourth control controlling the compressor (11) such that the air-conditioning capacity of the indoor heat exchanger (41) is brought close to the required capacity regardless of the commercial power consumption. When the air-conditioning capacity reaches the required capacity, it can be assumed that the refrigeration cycle has reached a steady state. Thus, shifting to the fourth control in accordance with these conditions enables a normal capacity control to be performed in the air-conditioning unit (1A) while the commercial power consumption is prevented from falling below the target value.

Second Embodiment

An air-conditioning system (1) of a second embodiment includes a power storage device (100) including a storage battery in addition to the air-conditioning unit (1A) of the first embodiment. That means that the air-conditioning system (1) of the second embodiment has a power storage function that stores the power of the commercial power source (C) and supplies charged power to the air-conditioning unit (1A), in addition to the thermal storage function.

Figure 17:
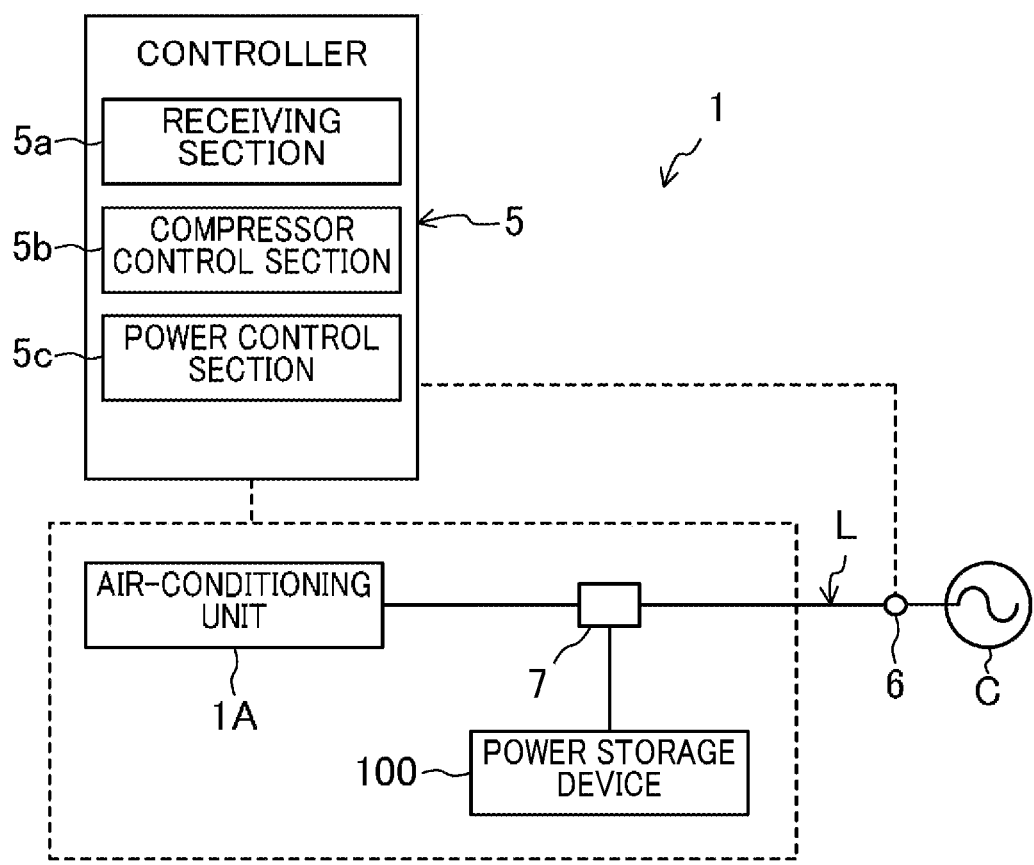
FIG. 17 is a schematic configuration diagram illustrating a relationship between an air-conditioning unit, a controller, and a commercial power source of a second embodiment.

As schematically illustrated in FIG. 17, a power switching circuit (7) is connected to the power supply line (L) of the air-conditioning system (1). The power switching circuit (7) includes a power conversion circuit alternately converting between AC power and DC power. The power switching circuit (7) is configured to be capable of switching between a first mode, a second mode, a third mode, and a fourth mode. In the first mode, the commercial power of the commercial power source (C) is supplied only to the air-conditioning unit (1A). In the second mode, the commercial power of the commercial power source (C) is supplied only to the power storage device (100). In the third mode, the commercial power of the commercial power source (C) is supplied to the air-conditioning unit (1A) and the power storage device (100). In the fourth mode, the commercial power of the commercial power source (C) and the power stored in the power storage device (100) are supplied to the air-conditioning unit (1A).

The controller (5) is provided with a receiving section (5a), a compressor control section (5b), and a power control section (5c). The power control section (5c) switches modes of the power switching circuit (7) and controls the power stored in the power storage device (100) and the power supplied from the power storage device (100) to the air-conditioning unit (1A).

In a first control of the second embodiment, the commercial power consumption in the entire system may be reduced to be made equal to or lower than the target commercial power consumption (first value) by supplying the power from the power storage device (100) to the air-conditioning unit (1A). That is, the power reduction section of the second embodiment is configured as the power storage device (100) and the controller (5) (strictly speaking, the power control section (5c)) controlling the power supplied from the power storage device (100) in the first control.

In a third control of the second embodiment, the commercial power consumption in the entire system may be kept equal to or higher than the target commercial power consumption (third value) by charging the commercial power from the commercial power source (C). That is, a power promotion section of the second embodiment is comprised of the power storage device (100) and the controller (5) (strictly speaking, the power control section (5c)) controlling the commercial power stored in the power storage device (100) in the third control.

Control at Start of First Operation

The control at the start of the first operation according to the second embodiment will be described with reference to FIGS. 18 and 19. Here, the control at the start of the first operation in the cooling mode will be described in detail.

Figure 18:
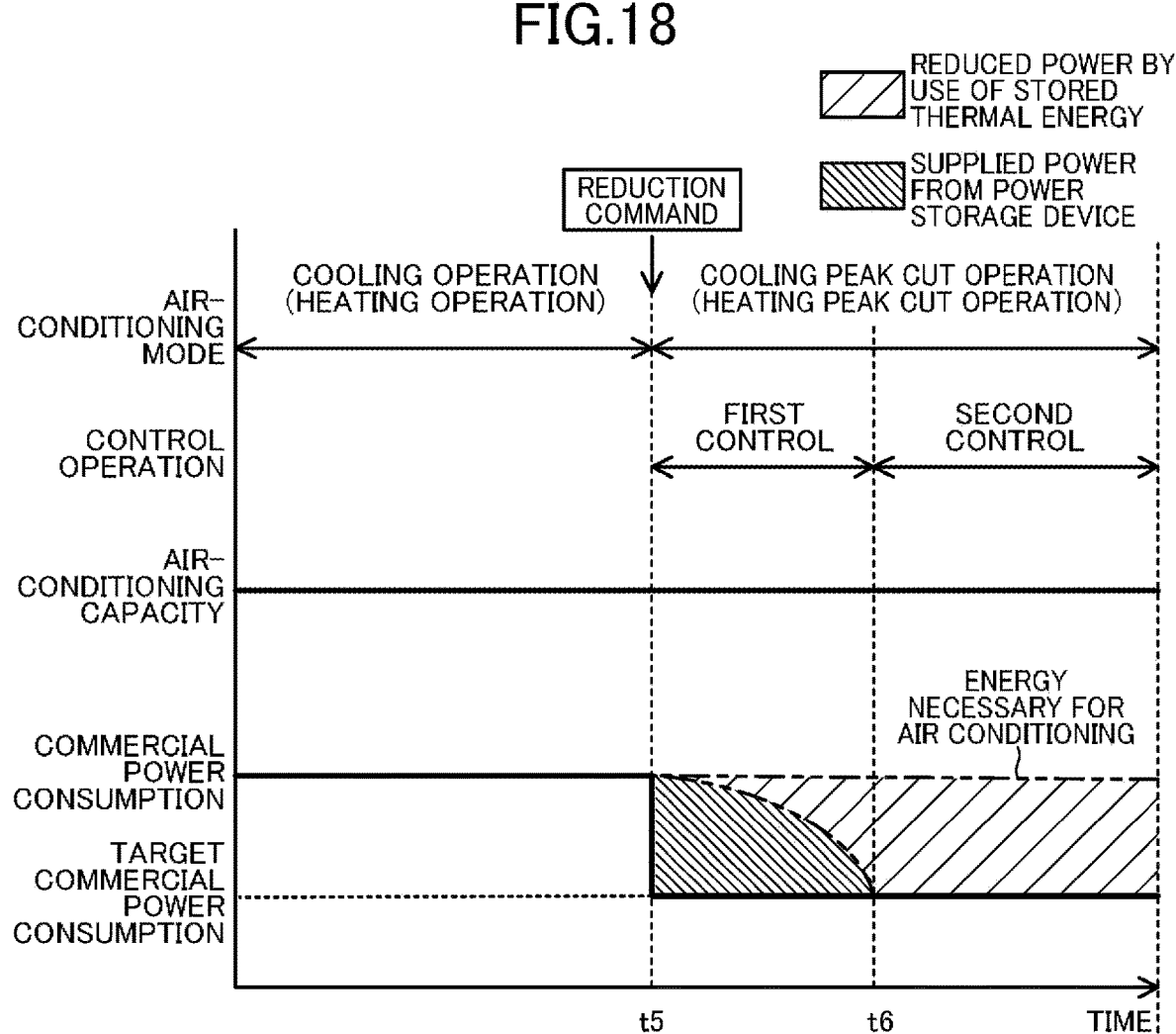
FIG. 18 is a time chart schematically illustrating a change in the air-conditioning capacity and the commercial power consumption in a first operation of the second embodiment.
Figure 19:
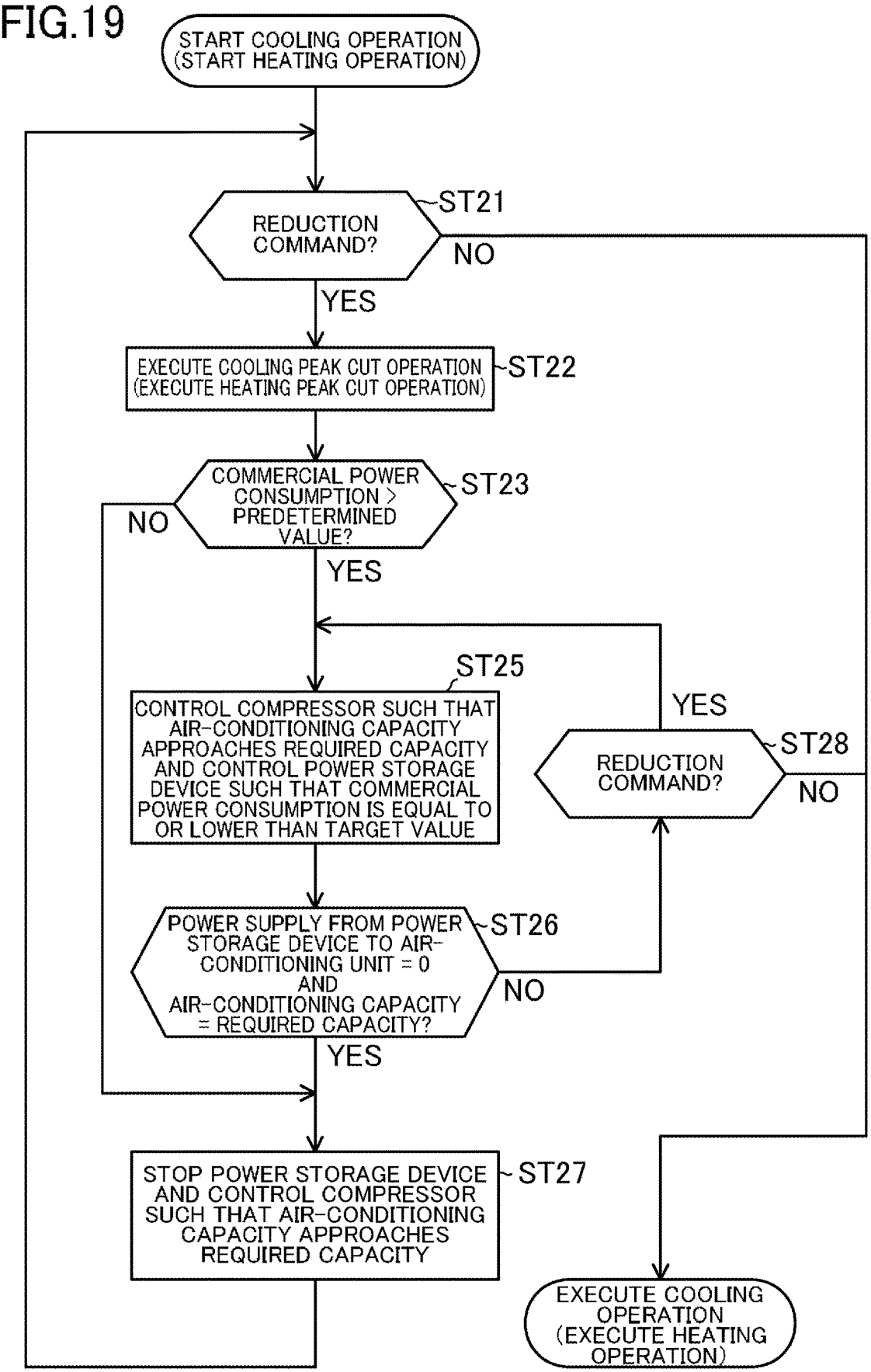
FIG. 19 is a flowchart of the first operation of the second embodiment.

As shown in FIG. 18, in the cooling operation, the air-conditioning unit (1A) is controlled to achieve a predetermined air-conditioning capacity (here, the cooling capacity) in the indoor unit (40) (indoor heat exchanger (41)). For example, suppose that, during the cooling operation, the receiving section (5a) receives the reduction command at time t5 in FIG. 18. In this case, the process proceeds from Step ST21 to Step ST22 in FIG. 19, and the cooling operation switches to the cooling peak cut operation.

Then, if the commercial power consumption detected by the power detector (6) in Step ST23 exceeds a predetermined value (second value), the process proceeds to the first control in Step ST25. The predetermined value may be the same as the target commercial power consumption (first value) in the cooling peak cut operation, or may be a predetermined value lower than the first value. On the other hand, in Step ST23, if the commercial power consumption is equal to or lower than the predetermined value (second value), the process proceeds to Step ST27, and the second control is performed. The second control brings the air-conditioning capacity close to the required capacity while stopping power storage device (100), and may be defined as the same as, for example, normal control of the cooling operation. The determination of Step ST23 may be omitted and the process may proceed to Step ST25 at any time when the cooling peak cut operation is started in Step ST22.

When the first control is executed in Step ST25, the controller (5) controls the compressor (11) to bring the air-conditioning capacity close to the required capacity. At the same time, the controller (5) switches the power switching circuit (7) to the fourth mode. In this way, the air-conditioning unit (1A) may be supplied with both the commercial power of the commercial power source (C) and the power stored in the power storage device (100). Here, the controller (5) controls the power supplied from the power storage device (100) such that the commercial power consumption in the entire system is made equal to or lower than the target commercial power consumption (first value). That is, in the first control, although the commercial power consumption equal to or lower than the first value and the air-conditioning capacity maintained at the required capacity level cause power deficiency, the power storage device (100) compensates for such power deficiency. Thus, as shown in FIG. 18, at the start of the first operation, the commercial power consumption may be prevented from exceeding the target commercial power consumption, and a sufficient air-conditioning capacity may be achieved.

As the refrigeration cycle of the air-conditioning unit (1A) approaches a steady state, the reduced electric power used for the thermal storage in the cooling peak cut operation gradually increases. Along with this, the power supplied from the power storage device (100) is gradually reduced.

In Step ST26, when the condition under which the power supply of the power storage device (100) becomes zero and the air-conditioning capacity is equal to or higher than the required capacity is satisfied, the first control ends and the second control is executed (Step ST27). If the condition of step ST26 is not satisfied, the process proceeds to Step ST28. If the reduction command is canceled in Step ST28, the process returns to the cooling operation. If the reduction command is not canceled, the control of Step ST25 is continuously performed.

If the condition of Step ST26 is satisfied at time t6 in FIG. 18, the process proceeds to Step ST27. In Step ST27, the second control is executed, and the power switching circuit (7) switches to the first mode. That is, in the second control, the power storage device (100) is stopped and the control (normal control) bringing the air-conditioning capacity close to the required capacity is performed regardless of the commercial power consumption. Therefore, the operation parameters are reduced after the process proceeds to step ST27. Further, the capacity of the power storage device (100) may be reduced in this manner by using the power storage device (100) only for the required minimum period.

As described above, at the start of the cooling peak cut operation, the first control for reducing the commercial power consumption in the entire system to the target commercial power consumption or lower is executed. As a result, the power reduction requirement may be reliably satisfied even at the start the cooling peak cut operation.

Although not shown in detail, the same control as in the cooling peak cut operation is performed in the heating peak cut operation that is the first operation. As a result, the power reduction requirement may be reliably satisfied even at the start of the heating peak cut operation.

Control at Start of Second Operation

The control at the start of the second operation according to the second embodiment will be described with reference to FIGS. 20 and 21. Here, the control at the start of the second operation in the cooling mode will be described in detail.

Figure 20:
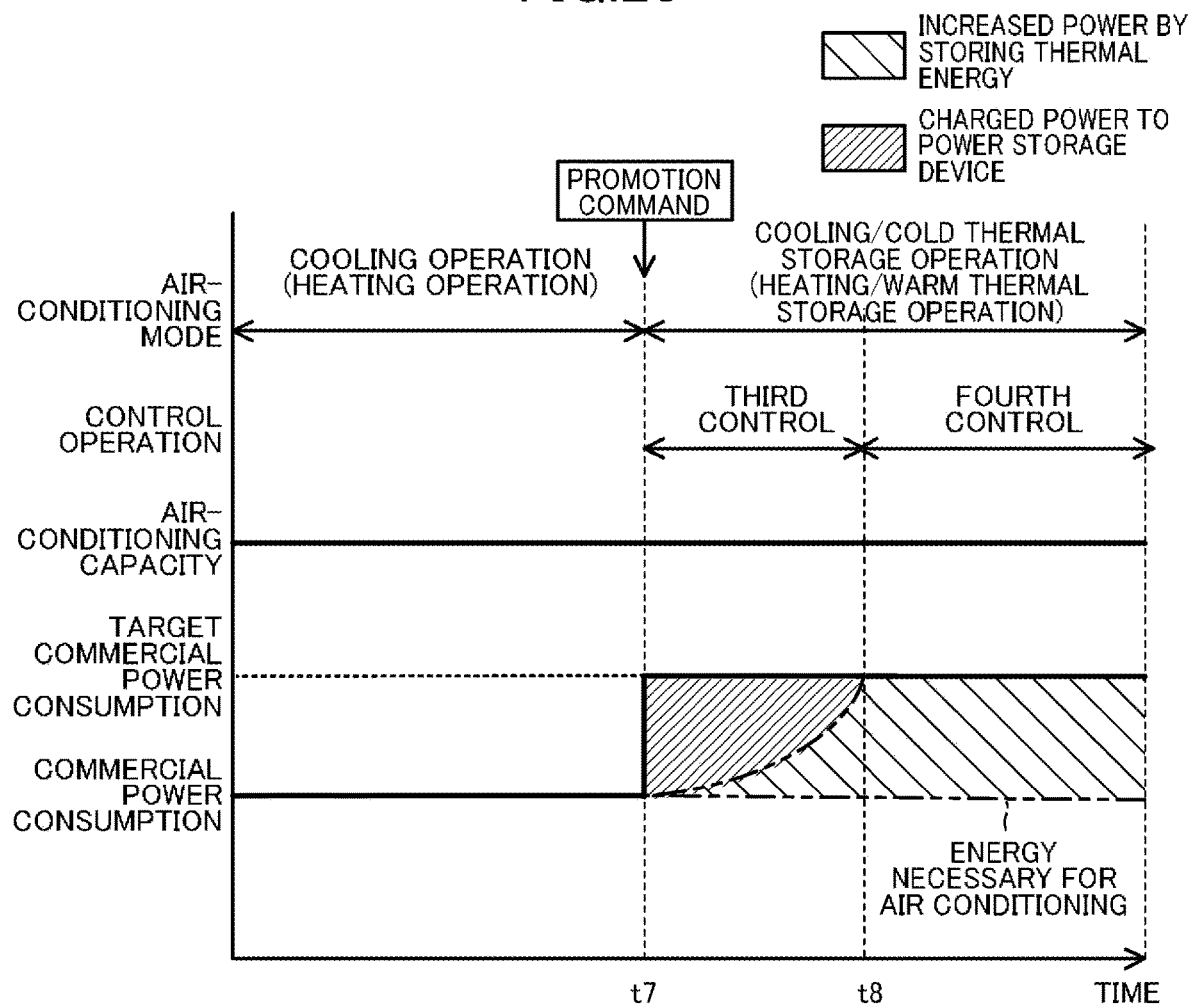
FIG. 20 is a time chart schematically illustrating a change in the air-conditioning capacity and the commercial power consumption in a second operation of the second embodiment.
Figure 21:
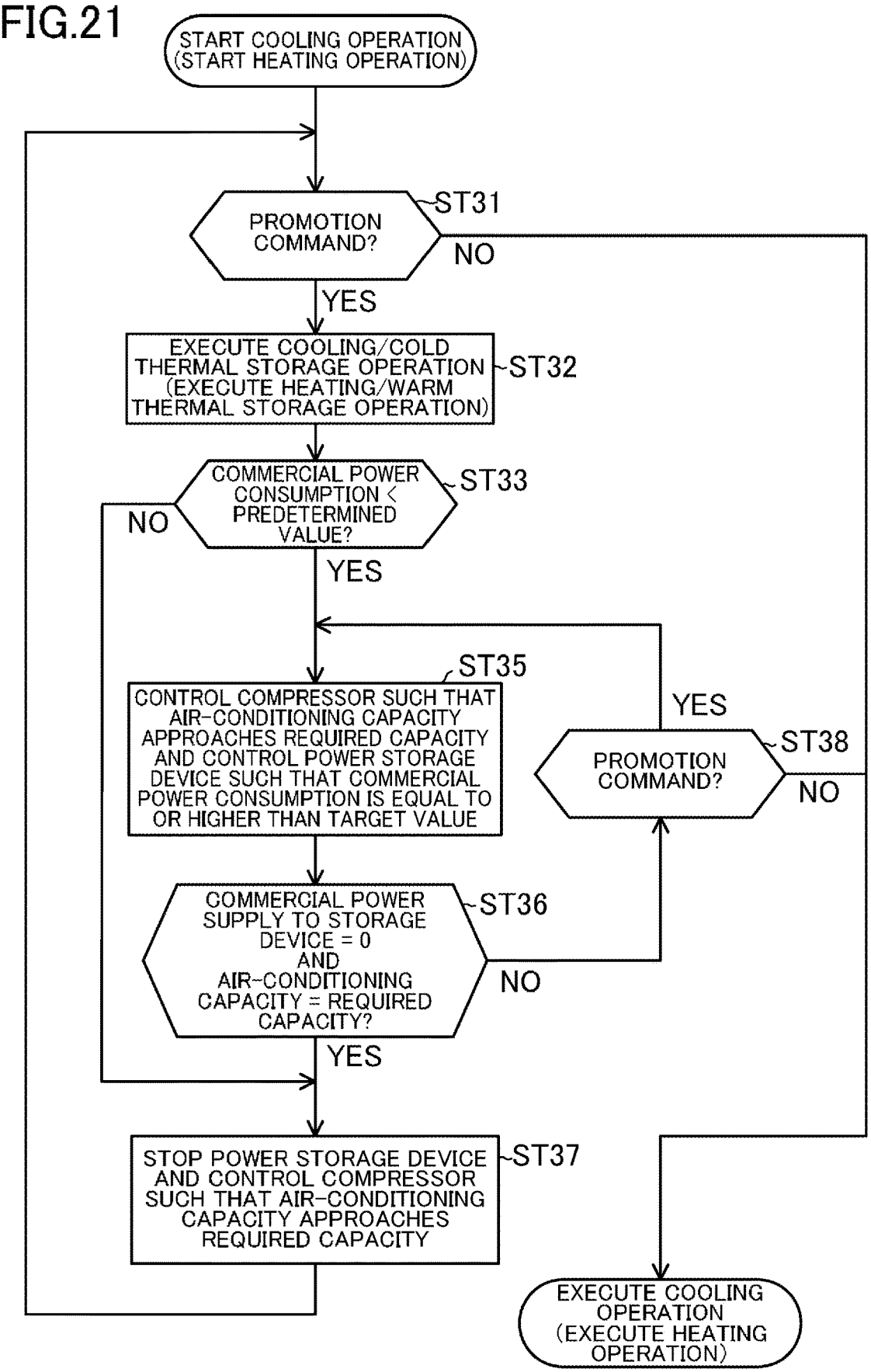
FIG. 21 is a flowchart of the second operation of the second embodiment.

As shown in FIG. 20, in the cooling operation, the air-conditioning unit (1A) is controlled to achieve a predetermined air-conditioning capacity (here, the cooling capacity) in the indoor unit (40) (indoor heat exchanger (41)). For example, suppose that, during the cooling operation, the receiving section (5a) receives the promotion command at time t7 in FIG. 20. In this case, the process proceeds from Step ST31 to Step ST32 in FIG. 21, and the cooling operation switches to the cooling/cold thermal storage operation.

Then, if the commercial power consumption detected by the power detector (6) in Step ST33 falls below a predetermined value (fourth value), the process proceeds to the third control in Step ST35. The predetermined value may be the same as the target commercial power consumption (third value) in the cooling/cold thermal storage operation, or may be a predetermined value higher than the third value. On the other hand, in Step ST33, if the commercial power consumption is equal to or higher than the predetermined value (fourth value), the process proceeds to step ST37, and the fourth control is performed. The fourth control brings the air-conditioning capacity close to the required capacity while stopping power storage device (100), and may be defined as the same as, for example, normal control of the cooling operation. The determination of step ST33 may be omitted and the process may proceed to Step ST35 at any time when the cooling/cold thermal storage operation is started in Step ST32.

When the third control is executed in Step ST35, the controller (5) controls the compressor (11) to bring the air-conditioning capacity close to the required capacity. At the same time, the controller (5) switches the power switching circuit (7) to the third mode. In this way, the commercial power of the commercial power source (C) may be supplied to both the air-conditioning unit (1A) and the power storage device (100). Here, the controller (5) controls the commercial power (charging power) stored in the power storage device (100) such that the commercial power consumption in the entire system is made equal to or higher than the target commercial power consumption (third value). That is, in the third control, although only maintaining the air-conditioning capacity at the required capacity level is not enough so as to cause the commercial power consumption to reach the target commercial power consumption, supplying commercial power to the power storage device (100) causes the commercial power consumption to reach the target commercial power consumption. Thus, as shown in FIG. 20, at the start of the second operation, the commercial power consumption may be prevented from falling below the target commercial power consumption, and the air-conditioning capacity may be maintained at the required capacity level.

As the refrigeration cycle of the air-conditioning unit (1A) approaches a steady state, the electric power increasing by the cooling/cold thermal storage operation gradually increases. Along with this, the charging power of the power storage device (100) gradually decreases.

In Step ST36, when the condition under which the commercial power (charging power) supplied from the commercial power source (C) to the power storage device (100) becomes zero and the air-conditioning capacity is at the required capacity level is satisfied, the third control ends and the fourth control is executed (Step ST37). If the condition of Step ST36 is not satisfied, the process proceeds to Step ST38. If the promotion command is canceled in Step ST38, the process returns to the cooling operation. If the promotion command is not canceled, the control of Step ST35 is continuously performed.

If the condition of Step ST36 is satisfied at time t8 in FIG. 20, the process proceeds to Step ST37. In Step ST37, the fourth control is executed, and the power switching circuit (7) switches to the first mode. That is, in the fourth control, the power storage device (100) is stopped and the control (normal control) bringing the air-conditioning capacity close to the required capacity is performed regardless of the commercial power consumption. Therefore, after the process proceeds to Step ST37, the control parameters are reduced and the controllability of the air-conditioning unit (1A) increases. Further, the capacity of the power storage device (100) may be reduced in this manner by using the power storage device (100) only for the required minimum period.

As described above, at the start of the cooling/cold thermal storage operation, the third control for reducing the commercial power consumption in the entire system to the target commercial power consumption or higher is executed. As a result, the power promotion requirement may be reliably satisfied even at the start of the cooling/cold thermal storage operation.

Advantages of Second Embodiment

The power reduction section of the second embodiment includes the power storage device (100) supplying the stored commercial power to the air-conditioning unit (1A), and the controller (5) (control device) controlling the power supplied from the power storage device (100) such that the commercial power consumption in the entire system is made equal to or lower than the first value, in the first control. This configuration enables the commercial power consumption in the entire system to be reliably reduced to the first value or lower by controlling the power storage device (100). In the first control, it is not necessary to significantly reduce the air-conditioning capacity of the air-conditioning unit (1A).

In the first control, the controller (5) of the second embodiment controls the compressor (11) such that the air-conditioning capacity of the indoor heat exchanger (41) (utilization-side heat exchanger) is brought close to the required capacity regardless of the commercial power consumption. This configuration allows both of the requirements, that is, the requirement to reduce the commercial power consumption and the requirement of the air-conditioning capacity to be reliably satisfied at the start of the first operation.

In the first control, the controller (5) of the second embodiment stops the power storage device (100) and allows the air-conditioning unit (1A) to continue the operation if the electric power supplied from the power storage device (100) to the air-conditioning unit (1A) is zero and the air-conditioning capacity of the indoor heat exchanger (41) (utilization-side heat exchanger) is the required capacity. That the power supplied from the power storage device (100) to the air-conditioning unit (1A) is zero and the air-conditioning capacity is the required capacity means that the refrigeration cycle in the first operation reaches a steady state. Consequently, the determination of this condition enables the power storage device (100) to be reliably stopped in accordance with the timing of the refrigeration cycle reaching a steady state. Afterward, only the air-conditioning unit (1A) only is controlled, and the cooling peak cut operation or the heating peak cut operation is continued. This improves the controllability of the air-conditioning system (1). In addition, the power supplied from the power storage device (100) to the air-conditioning unit (1A) may be reduced to the required minimum. Thus, the capacity of the power storage device (100) may be reduced, thus enabling the air-conditioning system (1) to be downsized.

The power promotion section of the second embodiment includes the power storage device (100) supplying the stored commercial power to the air-conditioning unit (1A), and the controller (5) (control device) controlling the commercial power stored in the power storage device (100) such that the commercial power consumption in the entire system is made equal to or higher than the third value, in the third control. This configuration enables the commercial power consumption in the entire system to be reliably reduced to the third value or higher by controlling the power storage device (100). In the third control, it is not necessary to significantly increase the air-conditioning capacity of the air-conditioning unit (1A).

In the third control, the controller (5) of the second embodiment controls the compressor (11) such that the air-conditioning capacity of the indoor heat exchanger (41) (utilization-side heat exchanger) is brought close to the required capacity regardless of the commercial power consumption. This configuration allows both of the requirements, that is, the requirement to promote the commercial power consumption and the requirement of the air-conditioning capacity to be reliably satisfied at the start of the second operation.

In the third control, the controller (5) of the second embodiment stops the power storage device (100) and allows the air-conditioning unit (1A) to continue the operation if the commercial power supplied to the power storage device (100) is zero and the air-conditioning capacity of the utilization-side heat exchanger (41) is the required capacity. That the charging power of the power storage device (100) is zero and the air-conditioning capacity is the required capacity means that the refrigeration cycle in the second operation reaches a steady state. Consequently, the determination of this condition enables the power storage device (100) to be reliably stopped in accordance with the timing of the refrigeration cycle reaching a steady state. Afterward, only the air-conditioning unit (1A) is controlled, and the cooling/cold thermal storage operation or the heating/warm thermal storage operation is continued. This improves the controllability of the air-conditioning system (1). In addition, the charging power supplied from the power storage device (100) to the air-conditioning unit (1A) may be reduced to the required minimum. Thus, the capacity of the power storage device (100) may be reduced, thus enabling the air-conditioning system (1) to be downsized.

Other Embodiments

The thermal storage unit (20) of the above-described air-conditioning system (1) may include a thermal storage circuit to which a thermal storage tank storing a thermal storage medium, a thermal storage heat exchanger, and a pump are connected. The thermal storage unit (20) may be of a so-called dynamic type that allows the thermal storage heat exchanger to exchange heat between the thermal storage medium in which the pump circulates and a refrigerant.

The thermal storage medium is not limited to water. The thermal storage medium may be a thermal storage medium generated by cooling clathrate hydrates (e.g., an aqueous solution of tetra-n-butylammonium bromide).

While the embodiments and variations thereof have been described above, it will be understood that various changes in form and details may be made without departing from the spirit and scope of the claims. The embodiments, variations thereof, and the other embodiments may be combined and replaced with each other without deteriorating intended functions of the present disclosure. The expressions of "first," "second," "third," described above are used to distinguish the words to which these expressions are given, and the number and order of the words are not limited.

The present disclosure is useful for an air-conditioning system.

The invention claimed is:

1. An air-conditioning system comprising:
a refrigerant circuit configured to perform a refrigeration cycle, the refrigerant circuit connecting a compressor, a utilization-side heat exchanger that performs air conditioning of an indoor space, and a thermal storage heat exchanger,
the air-conditioning system being configured to execute a first operation in accordance with a reduction command to reduce commercial power consumption in a whole of the air-conditioning system, the first operation allowing the utilization-side heat exchanger to perform air conditioning using the thermal storage heat exchanger as a heat source, and
the air-conditioning system including a power reduction section configured to perform a first control in synchronization with timing of a start of the first operation, the first control making the commercial power consumption in the whole of the air-conditioning system equal to or lower than a first value,
the power reduction section including
the compressor, and
an electronic controller configured to control, in the first control, the compressor such that the commercial power consumption in the whole of the air-conditioning system is made equal to or lower than the first value,
in the first control, the electronic controller being configured to control the compressor such that an air-conditioning capacity of the utilization-side heat exchanger is brought to be equal to a required capacity while making the commercial power consumption equal to or lower than the first value.

2. The air-conditioning system of claim 1, wherein,
at the start of the first operation, the electronic controller
is configured to perform the first control if the commercial power consumption exceeds a second value, and
is configured to perform a second control if the commercial power consumption is equal to or lower than the second value, the second control controlling the compressor such that the air-conditioning capacity of the utilization-side heat exchanger is brought to be equal to the required capacity regardless of the commercial power consumption.

3. The air-conditioning system of claim 1, wherein
the electronic controller is configured to stop the compressor at a start of the first control.

4. An air-conditioning system comprising:
a refrigerant circuit configured to perform a refrigeration cycle, the refrigerant circuit connecting a compressor, a utilization-side heat exchanger that performs air conditioning of an indoor space, and a thermal storage heat exchanger,
the air-conditioning system being configured to execute a first operation in accordance with a reduction command to reduce commercial power consumption in a whole of the air-conditioning system, the first operation allowing the utilization-side heat exchanger to perform air conditioning using the thermal storage heat exchanger as a heat source, and the air-conditioning system including a power reduction section configured to perform a first control in synchronization with timing of a start of the first operation, the first control making the commercial power consumption in the whole of the air-conditioning system equal to or lower than a first value, the power reduction section including
the compressor, and
an electronic controller configured to control, in the first control, the compressor such that the commercial power consumption in the whole of the air-conditioning system is made equal to or lower than the first value, in the first control, the electronic controller being configured to perform a second control if an air-conditioning capacity of the utilization-side heat exchanger reaches a required capacity, the second control controlling the compressor such that the air-conditioning capacity of the utilization-side heat exchanger is maintained at the required capacity regardless of the commercial power consumption.

5. An air-conditioning system comprising:
a refrigerant circuit configured to perform a refrigeration cycle, the refrigerant circuit connecting a compressor, a utilization-side heat exchanger that performs air conditioning of an indoor space, and a thermal storage heat exchanger,
the air-conditioning system being configured to execute a first operation in accordance with a reduction command to reduce commercial power consumption in a whole of the air-conditioning system, the first operation allowing the utilization-side heat exchanger to perform air conditioning using the thermal storage heat exchanger as a heat source, and
the air-conditioning system including a power reduction section configured to perform a first control in synchronization with timing of a start of the first operation, the first control making the commercial power consumption in the whole of the air-conditioning system equal to or lower than a first value,
an air-conditioning unit including the refrigerant circuit,
the power reduction section including
a power battery configured to supply stored commercial power to the air-conditioning unit, and
an electronic controller configured to control, in the first control, the commercial power supplied from the power battery such that the commercial power consumption in the whole of the air-conditioning system is made equal to or lower than the first value,
in the first control, the electronic controller being configured to control the compressor such that an air-conditioning capacity of the utilization-side heat exchanger is brought to be equal to a required capacity regardless of the commercial power consumption.

6. The air-conditioning system of claim 5, wherein,
in the first control, the electronic controller is configured to stop the power battery and allow the air-conditioning unit to continue the first operation if the power supplied from the power battery to the air-conditioning unit is zero and the air-conditioning capacity of the utilization-side heat exchanger is the required capacity.

7. An air-conditioning system comprising:
a refrigerant circuit configured to perform a refrigeration cycle, the refrigerant circuit connecting a compressor, a utilization-side heat exchanger that performs air conditioning of an indoor space, and a thermal storage heat exchanger,
the air-conditioning system being configured to execute a second operation in accordance with a promotion command to promote commercial power consumption in a whole of the air-conditioning system, the second operation allowing the utilization-side heat exchanger to perform air conditioning while allowing the thermal storage heat exchanger to store thermal energy, and
the air-conditioning system including a power promotion section configured to perform a third control in synchronization with timing of a start of the second operation, the third control making the commercial power consumption in the whole of the air-conditioning system equal to or higher than a third value,
the power promotion section including
the compressor, and
an electronic controller configured to control, in the third control, the compressor such that the commercial power consumption in the whole of the air-conditioning system is made equal to or higher than the third value,
in the third control, the electronic controller being configured to control the compressor such that an air-conditioning capacity of the utilization-side heat exchanger is brought to be equal to a required capacity while making the commercial power consumption equal to or higher than the third value.

8. The air-conditioning system of claim 7, wherein,
at the start of the second operation, the electronic controller
is configured to perform the third control if the commercial power consumption falls below a fourth value, and
is configured to perform a fourth control if the commercial power consumption is equal to or higher than the fourth value, the fourth control controlling the compressor such that the air-conditioning capacity of the utilization-side heat exchanger is brought to be equal to the required capacity regardless of the commercial power consumption.

9. An air-conditioning system comprising:
a refrigerant circuit configured to perform a refrigeration cycle, the refrigerant circuit connecting a compressor, a utilization-side heat exchanger that performs air conditioning of an indoor space, and a thermal storage heat exchanger,
the air-conditioning system being configured to execute a second operation in accordance with a promotion command to promote commercial power consumption in a whole of the air-conditioning system, the second operation allowing the utilization-side heat exchanger to perform air conditioning while allowing the thermal storage heat exchanger to store thermal energy, and
the air-conditioning system including a power promotion section configured to perform a third control in synchronization with timing of a start of the second operation, the third control making the commercial power consumption in the whole of the air-conditioning system equal to or higher than a third value,
the power promotion section including
the compressor, and
an electronic controller configured to control, in the third control, the compressor such that the commercial power consumption in the whole of the air-conditioning system is made equal to or higher than the third value, in the third control, the electronic controller being configured to perform a fourth control if an air-conditioning capacity of the utilization-side heat exchanger reaches a required capacity, the fourth control controlling the compressor such that the air-conditioning capacity of the utilization-side heat exchanger is maintained at the required capacity regardless of the commercial power consumption.

10. An air-conditioning system comprising:
an air-conditioning unit including a refrigerant circuit configured to perform a refrigeration cycle, the refrigerant circuit connecting a compressor, a utilization-side heat exchanger that performs air conditioning of an indoor space, and a thermal storage heat exchanger,
the air-conditioning system being configured to execute a second operation in accordance with a promotion command to promote commercial power consumption in a whole of the air-conditioning system, the second operation allowing the utilization-side heat exchanger to perform air conditioning while allowing the thermal storage heat exchanger to store thermal energy, and
the air-conditioning system including a power promotion section configured to perform a third control in synchronization with timing of a start of the second operation, the third control making the commercial power consumption in the whole of the air-conditioning system equal to or higher than a third value,
the power promotion section including
a power battery configured to supply stored commercial power to the air-conditioning unit, and
an electronic controller configured to control, in the third control, the commercial power stored in the power battery such that commercial power consumption in the whole of the air-conditioning system is made equal to or higher than the third value,
in the third control, the electronic controller being configured to control the compressor such that an air-conditioning capacity of the utilization-side heat exchanger is brought to be equal to a required capacity regardless of the commercial power consumption.

11. The air-conditioning system of claim 10, wherein
in the third control, the electronic controller is configured to stop the power battery and allow the air-conditioning unit to continue the second operation if the commercial power supplied to the power battery is zero and the air-conditioning capacity of the utilization-side heat exchanger is the required capacity.

* * * * *